US007941866B2

(12) United States Patent
Takigawa et al.

(10) Patent No.: US 7,941,866 B2
(45) Date of Patent: May 10, 2011

(54) SEMICONDUCTOR APPARATUS AND SIGNAL PROCESSING SYSTEM

(75) Inventors: Kazuhisa Takigawa, Kanagawa (JP); Kengo Okada, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 997 days.

(21) Appl. No.: 11/528,580

(22) Filed: Sep. 28, 2006

(65) Prior Publication Data
US 2007/0296460 A1 Dec. 27, 2007

(30) Foreign Application Priority Data
Jun. 21, 2006 (JP) .................................. 2006-171561

(51) Int. Cl.
*G06F 13/00* (2006.01)
(52) U.S. Cl. ............ 726/36; 726/26; 713/189; 713/191; 713/193; 365/189.03; 365/207; 710/36
(58) Field of Classification Search .................... None
See application file for complete search history.

(56) References Cited

U.S. PATENT DOCUMENTS

| | | | | |
|---|---|---|---|---|
| 5,812,492 A | * | 9/1998 | Yamauchi et al. | 365/233.5 |
| 5,910,181 A | * | 6/1999 | Hatakenaka et al. | 714/718 |
| 6,339,318 B1 | * | 1/2002 | Tanaka | 323/313 |
| 7,127,616 B2 | * | 10/2006 | Kaneko | 713/191 |
| 2001/0018749 A1 | * | 8/2001 | Noda et al. | 713/310 |
| 2003/0159062 A1 | * | 8/2003 | Tozawa et al. | 713/200 |

FOREIGN PATENT DOCUMENTS

| JP | 2004-343383 | 12/2004 |
|---|---|---|
| JP | 2005-136572 | 5/2005 |

* cited by examiner

*Primary Examiner* — Taghi T Arani
*Assistant Examiner* — Amir Mehrmanesh
(74) *Attorney, Agent, or Firm* — Young & Thompson

(57) ABSTRACT

A semiconductor apparatus of the present invention includes a first to a fourth external terminals and a decoding circuit. The semiconductor apparatus in a first mode inputs a first encoded data from the first external terminal, decodes the first encoded data by the decoding circuit to generate a first decoded data, outputs the first decoded data from the fourth external terminal, and the semiconductor apparatus in a second mode, inputs a second encoded data from the first external terminal, outputs the second encoded data input from the first external terminal from the second external terminal, inputs the second encoded data output from the second external terminal from the third external terminal, decodes the second encoded data input from the third external terminal by the decoding circuit to generate a second decoded data and outputs the second decoded data from the fourth external terminal.

10 Claims, 26 Drawing Sheets

| POWER SUPPLY \ MODE | EVDD | DVDD | | | PLLVDD | MEMVDD | APPLICATION PROCESSOR |
| --- | --- | --- | --- | --- | --- | --- | --- |
| | | DVDD1 | DVDD2 | DVDD3 | | | |
| POWER OFF | - | - | - | - | - | - | ON/OFF |
| DEEP SLEEP | ON | - | - | - | - | - | ON |
| SLEEP | ON | ON | - | - | ON | - | ON |
| STAND-ALONE | ON | ON | ON | ON | ON | ON | ON/OFF |
| DSP | ON | ON | ON | - | ON | - | ON |
| MEMORY ACCESS+DSP | ON | ON | ON | ON | ON | ON | ON |
| MEMORY ACCESS | ON | ON | - | ON | ON | ON | ON |

Fig. 10

SEMICONDUCTOR APPARATUS AND SIGNAL PROCESSING SYSTEM

BACKGROUND OF THE INVENTION

1. Field of the Invention

The present invention relates to a semiconductor apparatus and a signal processing system, and particularly to a semiconductor apparatus and a signal processing system that is capable of switching operations of the semiconductor apparatus depending on a function to be realized in the semiconductor apparatus and in peripheral semiconductor apparatuses connected thereto.

2. Description of Related Art

A cellular phone of recent days includes application function such as music player other than dialing function. A technique disclosed in Japanese Unexamined Patent Application Publication No. 2004-343383 integrate a LSI for realizing the dialing function and a LSI for realizing the application function as one semiconductor chip. On the other hand a technique disclosed in Japanese Unexamined Patent Application Publication No. 2005-136572 provides a LSI for realizing the dialing function separately from a LSI for realizing the application function.

As described in Japanese Unexamined Patent Application Publication No. 2005-136572, in case a plurality of semiconductor apparatuses are mounted to a cellular phone, there are still needs for improvement in whether to realize a function such as a music player by one of the plurality of semiconductor apparatuses or by combining the plurality of semiconductor apparatuses.

SUMMARY OF THE INVENTION

According to an aspect of the present invention, there is provided a semiconductor apparatus that includes a first to a fourth external terminals and a decoding circuit. The semiconductor apparatus in a first mode inputs a first encoded data from the first external terminal, decodes the first encoded data by the decoding circuit to generate a first decoded data, outputs the first decoded data from the fourth external terminal, and the semiconductor apparatus in a second mode, inputs the second encoded data from the first external terminal, outputs a second encoded data input from the first external terminal from the second external terminal, inputs the second encoded data output from the second external terminal from the third external terminal, decodes the second encoded data input from the third external terminal by the decoding circuit to generate a second decoded data and outputs the second decoded data from the fourth external terminal.

With the semiconductor apparatus of the present invention, in the second mode advanced functions can be realized by the semiconductor apparatus of the present invention and peripheral semiconductor apparatuses thereof. In the first mode, functions that can be realized only with the semiconductor apparatus of the present invention separately from peripheral semiconductor apparatuses can be performed.

According to another aspect of the present invention, there is provided a signal processing system that includes a first semiconductor apparatus having a first to a fourth external terminals and a decoding circuit, and a second semiconductor apparatus having a fifth to a sixth external terminals. The first semiconductor in a first mode, inputs a first encoded data from the first external terminal, decodes the first encoded data by the decoding circuit to generate a first decoded data, outputs the first decoded data from the fourth external terminal, and the first semiconductor apparatus in a second mode, inputs a second encoded data from the first external terminal, outputs the second encoded data input from the first external terminal from the second external terminal, the second semiconductor apparatus, inputs the second encoded data output from the second external terminal from the fifth external terminal, outputs the second encoded data input from the fifth external terminal from the sixth external terminal, and the first semiconductor apparatus, inputs the second encoded data output from the sixth external terminal from the third external terminal, decodes the second encoded data input from the third external terminal by the decoding circuit to generate a second decoded data, and outputs the second decoded data from the fourth external terminal.

With the signal processing system of the present invention, in the second mode, advanced function can be realized by combining the first and the second semiconductor apparatuses in the second mode. In the first mode, functions that can be realized by only the first semiconductor apparatus can be performed separately from the second semiconductor apparatus.

BRIEF DESCRIPTION OF THE DRAWINGS

The above and other objects, advantages and features of the present invention will be more apparent from the following description taken in conjunction with the accompanying drawings, in which:

FIG. 10 is a table showing a state of a power supply in each operation mode of the signal processing control apparatus of the first embodiment;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
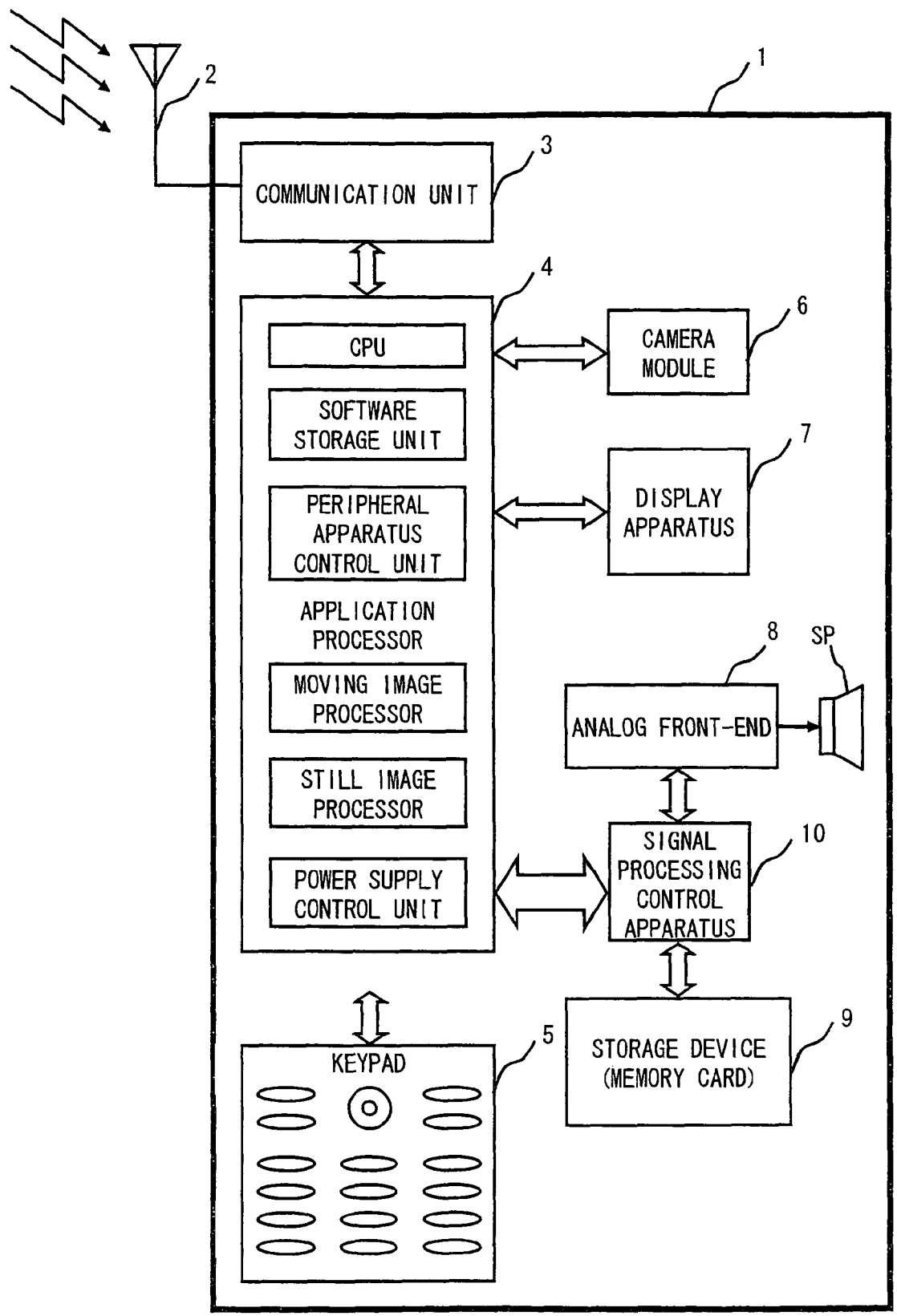
FIG. 1 is a block diagram of a cellular phone 1 according to a first embodiment of the present invention.

An embodiment of the present invention is described hereinafter in detail with reference to the drawings. As an example of a mobile device having a semiconductor of this embodiment therewith, a cellular phone is explained hereinafter. A block diagram of a cellular phone 1 of the present invention is illustrated in FIG. 1. As shown in FIG. 1, the cellular phone 1 includes an antenna 2, a communication unit 3, a second semiconductor apparatus (for example an application processor 4), a keypad 5, a camera module 6, a display apparatus 7, an analog front-end 8, a storage device 9, and a first semiconductor apparatus (for example a signal processing control apparatus 10). The semiconductor apparatus of the present invention is mounted as the signal processing control apparatus 10.

The antenna 2 sends/receives radio waves used by the cellular phone 1. The communication unit 3 is a processor for the radio waves used by the cellular phone 1. The communication unit 3 for example encodes radio waves to be sent and decodes radio waves received. The communication unit 3 is comprised of a RF (Radio Frequency) circuit and a DBB (Digital Base Band) circuit, for example. The application processor 4 performs various functions provided to a cellular phone, for example. Thus the application processor 4 includes a plurality of blocks. For example a CPU (Central Processing Unit) for operating and controlling according to software, a software storage unit for storing software used in the CPU, a peripheral apparatus control unit for controlling peripheral apparatuses such as a camera module, a video processor for encoding or decoding movie, a still image processor for encoding or decoding a still image, and a power supply control unit for controlling power supply of apparatuses mounted to the device.

The keypad 5 is an interface for a user to operate the cellular phone 1. The application processor 4 performs various controls according to a direction from the keypad 5. The camera module 6 is an apparatus having an image pickup device for shooting still or moving image. The display apparatus 7 displays various process results. The analog front-end 8 converts an audio signal processed in digital signal into an analog signal to drive an audio output apparatus such as a speaker SP. The signal processing control apparatus 10 processes audio data. Details of the signal processing control apparatus are explained later. The storage device 9 stores data. This embodiment adopts a memory card inserted to a mobile device. The memory card operates according to a given specification. The memory card is controlled by a storage control circuit that controls according to the specification. The storage device 9 is not restricted to the one inserted externally but may be an embedded storage device.

Figure 2:
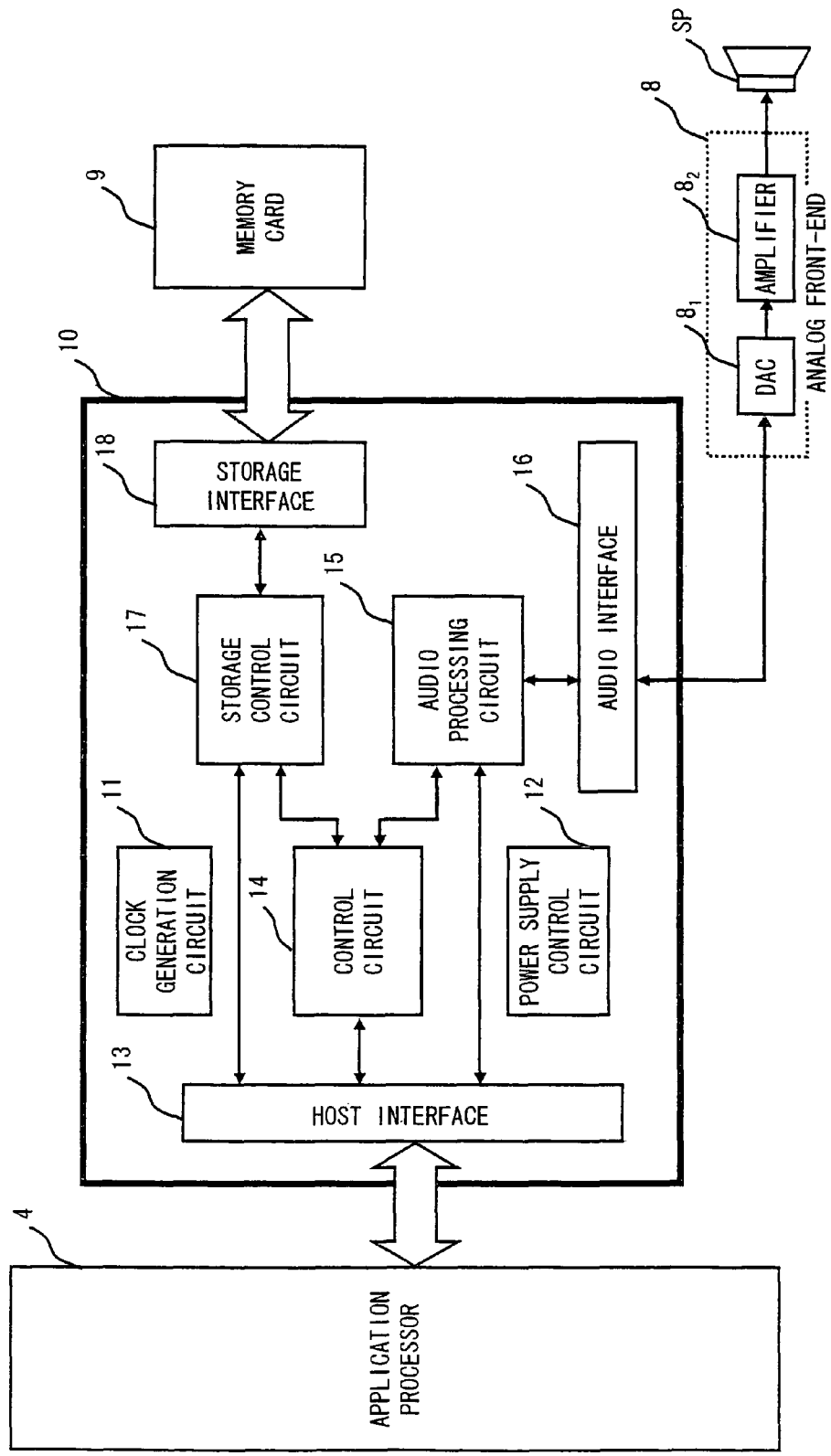
FIG. 2 is a block diagram showing a signal processing control apparatus of the first embodiment and peripheral apparatuses therewith.

The signal processing control apparatus 10 is explained hereinafter in detail. FIG. 2 is a block diagram showing the signal processing control apparatus 10 and peripheral apparatuses thereof. As shown in FIG. 2, the signal processing control apparatus 10 is connected to the application processor 4, the memory card 9, and the analog front-end through bus lines. The analog front-end 8 includes a $DAC8_1$ and an amplifier $8_2$. The $DAC8_1$ converts a digital signal generated by the signal processing control apparatus 10 into an analog signal and outputs the analog signal to the amplifier $8_2$. The amplifier $8_2$ amplifies the analog signal outputted from the $DAC8_1$ to drive the speaker SP. The speaker SP outputs audio according to the analog signal.

The signal processing control apparatus 10 includes a clock generation circuit 11, a power supply control circuit 12, a host interface 13, a control circuit 14, a decoding circuit (for example an audio processing circuit 15), an audio interface 16, a storage control circuit 17, and a storage interface 18.

The clock generation circuit 11 generates a clock signal according to a reference clock signal CLKIN input externally to be used by the signal processing control apparatus 10. The power supply control circuit 12 distributes power supply voltage supplied externally to each block and controls the distributed power supplies separately. The host interface 13 sends/receives a signal to/from the application processor 4 that controls the signal processing control apparatus 10. The control circuit 14 controls path of data sent/received in the signal processing control apparatus 10. The audio processing circuit 15 decodes encoded data (for example audio data compressed in a certain format) to generate decoded data (for example uncompressed audio data). The decoded audio data is sent to the analog front-end through the audio interface 16. By the analog front-end 8 driving the speaker SP according to the audio data plays the audio data. The audio interface 16 sends/receives data to/from the signal processing control apparatus 10 and apparatuses connected to the signal processing control apparatus 10. The above encoded and decoded data are used as a first to fourth encoded data and a first to fourth decoded data in a first to fourth operation modes described later in detail.

The storage control circuit 17 controls writing and reading of data to/from the memory card 9 in this embodiment. The storage interface 18 sends/receives data to/from the signal processing control apparatus 10 and the memory card 9. In this embodiment, data stored to the memory card 9 is encoded to protect copyright, for example. The encoded data is decoded by the storage control circuit 17. The storage control circuit 17 encodes the data when it writes the data to the memory card 9. The encoded data is written to the memory card through the storage interface 18.

With the storage control circuit included therein, the signal processing control apparatus 10 of this embodiment is able to send/receives audio data with the memory card. Further, with the audio processing circuit 15 included therein, the signal processing control apparatus 10 is able to decode compressed audio data. The control circuit 14 is capable of controlling path of data inside the signal processing control apparatus 10. By the control circuit 14 sending the audio data read out by the storage control circuit 17 to the audio processing circuit 15, the signal processing control apparatus 10 is able to play the audio data without the application processor. That is, the signal processing control apparatus 10 is capable of playing audio data in the memory card independently from the application processor 4.

Size and power consumption of the application processor 4 are large in order to achieve a number of functions. The application processor 4 generally has a high computational capability so as to process moving image. However playing audio data does not require processing capability as high as moving image. Higher computational capability needs more power to be consumed due to an increase in clock frequency. Specifically, playing audio data using the application processor 4 consumes power more than necessary.

On the other hand the signal processing control apparatus 10 of the present invention is capable of playing audio data by the audio processing circuit 15 that specializes in processing audio data. Further, the signal processing control apparatus 10 is able to play audio data in the memory card independently from the application processor 4. This makes it possible for the signal processing control apparatus 10 to play audio data even in a low power consumption state whereby the application processor 4 is suspended. In other words, specializing function to reduce power consumption of other parts enables to reduce power consumption of the overall apparatus while performing the specialized function.

Figure 3:
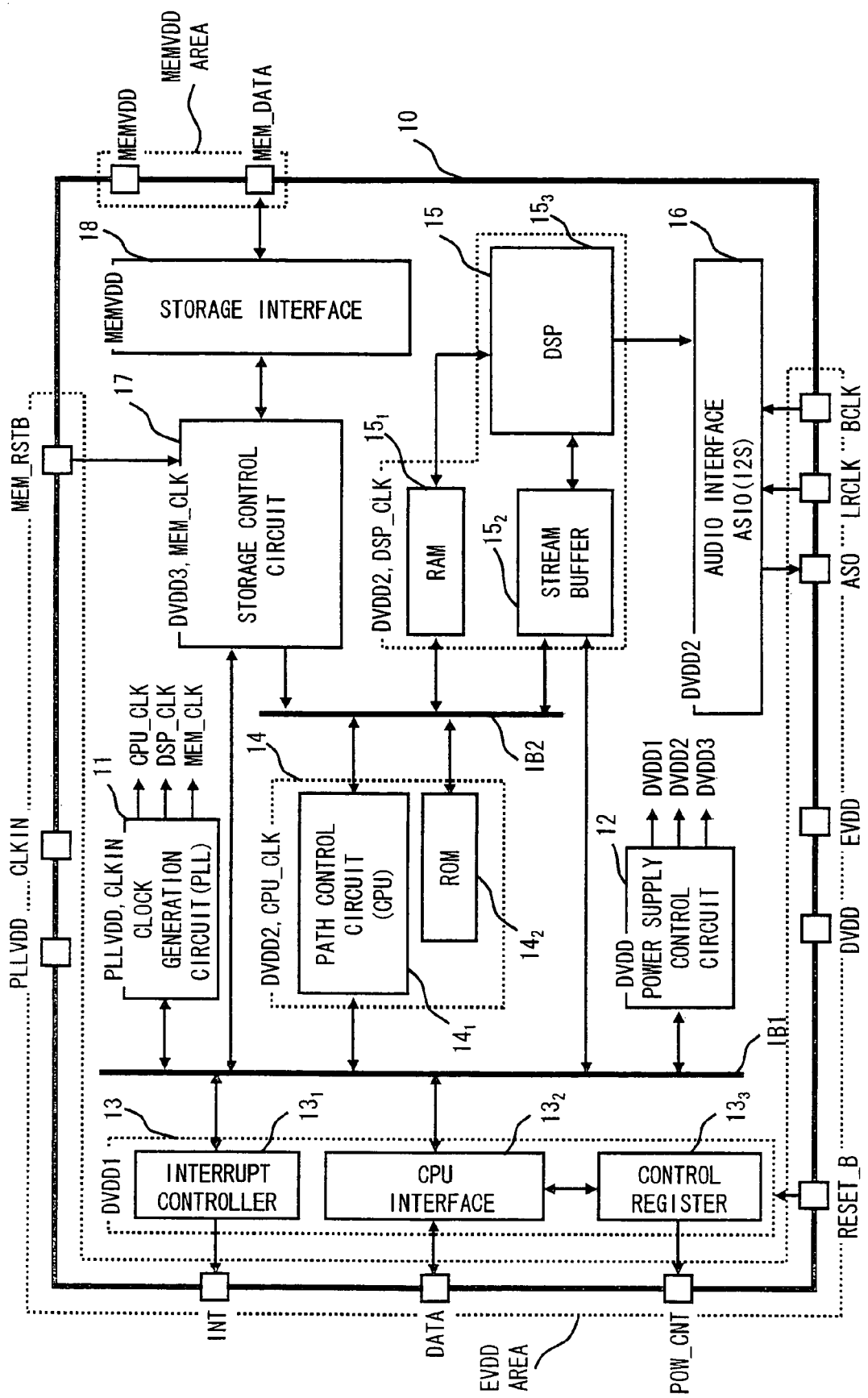
FIG. 3 is a detailed block diagram showing the signal processing control apparatus of the first embodiment.

The signal processing control apparatus 10 is described hereinafter in detail. FIG. 3 shows a detailed block diagram of the signal processing control apparatus 10. As shown in FIG. 3, the signal processing control apparatus 10 includes power supply terminals for inputting power supplies EVDD, DVDD, PLLVDD, and MEMVDD, input terminals for data signals INT, DATA, POW_CNT, ASO, and MEM_DATA, reset terminals for inputting reset signals RESET_B and MEM_RSTB, clock input/output terminals for inputting/outputting clock signals LRCLK, BCLK, and CLKIN. The input/output terminals for the data signals DATA and MEM_DATA and the clock input/output terminals for inputting/outputting the clock signals LRCLK, BCLK, and CLKIN may have separate terminals for input and output, or may have one terminal to input and output. In the explanation below, a first external terminal refers to the input/output terminal for MEM_DATA, a second external terminal refers to a terminal that the input/output terminal of the data signal DATA used as an output terminal, a third external terminal refers to a terminal that the input/output terminal for the data signal DATA used as an input terminal, a fourth external terminal refers to the input/output terminal for the data signal ASO, a fifth external terminal refers to the input terminal of the data signal DATA, and a sixth external terminal refers to an output terminal of the data signal DATA in the application processor 4.

The signal processing control apparatus 10 operates according to a power supply supplied to each power supply terminals by an external apparatus. The input/output terminals, reset terminals, and the clock input/output terminals include input and output buffers. These buffers operate according to the power supplies EVDD and MEMVDD. For example the input/output terminals for the data signals INT, DATA, POW_CNT, and ASO, the input terminals for the reset signals RESET_B and MEM_RSTB, the clock input/output terminals for inputting/outputting the clock signals LRCLK, BCLK, and CLKIN operate according to the power supply EVDD. Further, the input/output terminal for the data signal MEM_DATA operates according to the power supply MEMVDD. In this embodiment, operating power supply voltage differs between the signal processing control apparatus 10 and peripheral circuit thereof. Thus the terminals other than power supply terminal and the input/output terminal MEM_DATA includes level shift circuits. The level shifts circuits align amplitude of signals inside the signal processing control apparatus 10 and amplitudes of signals in other circuits. The memory card 9 operates on a power supply voltage different from the signal processing control apparatus 10. However amplitude of signals read out from the memory card 9 is aligned by the storage interface 18 to level shift.

As described above, the signal processing control apparatus 10 includes the clock generation circuit 11, the power supply control circuit 12, the host interface 13, the control circuit 14, the audio processing circuit 15, the audio interface 16, the storage control circuit 17, and the storage interface 18. The blocks are described hereinafter in detail with reference to FIG. 3. Each block is connected through internal buses IB1 and IB2.

The clock generation circuit 11 operates according to the power supply PLLVDD input externally. The clock generation circuit 11 is a PLL (Phase Locked Loop) circuit, for example that generates clocks corresponding to operating frequencies of each blocks according to the clock signal CLKIN input externally. In this embodiment, the clock generation circuit 11 generates a clock signal CPU_CLK to be supplied to the control circuit 14, a clock signal DSP_CLK to be supplied to the audio processing circuit 15, a clock signal MEM_CLK to be supplied to the storage control circuit 17. Frequencies of the clock signals to be generated are configured according to data sent from the application processor 4 through the host interface 13 and the internal bus IB1. Configuration of a frequency of a clock signal to be generated may be modified depending on usage status.

The power supply control circuit 12 distributes the power supply DVDD input externally to each block and controls the distributed power supply independently. In this embodiment, the power supply control circuit 12 only distributes the power supply voltage being input. However the power supply control circuit 12 may boost or step down the voltage of an input power supply to generate voltages that differ depending on the power supplies being output. In this embodiment, the power supply control circuit 12 distributes the power supply DVDD being input into three. For example the power supply control circuit 12 distributes into a power supply DVDD1 to be supplied to the host interface 13, a power supply DVDD2 to be supplied to the control circuit 14, the audio processing circuit 15, and the audio interface 16, and a power supply DVDD3 to be supplied to the storage control circuit 17. The power supply to be distributed is activated and deactivated depending on the data sent from the application processor 4 through the host interface 13 and the internal bus IB1. The power supply to be distributed is controlled separately for each power supply.

The host interface 13 sends/receives data to/from the application processor 4 through bus. Data sent/received is data associated with register address. That is, in case the signal processing control apparatus 10 finds a register address of a register in the signal processing control apparatus 10, the signal processing control apparatus 10 receives data associated with the register address and operates according to the data. The signal processing control apparatus 10 associates output data with a register address of an apparatus to send to. Specifically the host interface 13 monitors data in the bus lines and outputs data to the bus lines. The blocks in the signal processing control apparatus 10 each includes a register and operates according to data stored to the registers. The host interface 13 is activated and deactivated depending on the reset signal RESET_B input externally.

The host interface 13 includes an interrupt controller $13_1$, a CPU interface $13_2$, and a control register $13_3$. The interrupt controller $13_1$ monitors the bus lines and receives data (for example interrupt instruction INT) output from the application processor 4. The interrupt controller $13_1$ interrupts a process being executed by the signal processing control apparatus 10, so that the signal processing control apparatus 10 can be ready to receive data from the application processor 4.

The CPU interface $13_2$ relays data sent/received to/from the control circuit 14, the audio processing circuit 15, the audio interface 16, the storage control circuit 17, and the application processor 4. The CPU interface $13_2$ includes a register and temporarily stores data to be sent/received in the register. Other block reads the stored data. By this operation the CPU interface $13_2$ relays data to the interface circuit 14, the audio processing circuit 15, the audio interface 16, the storage control circuit 17, and the application processor 4.

For example in case the signal processing control apparatus 10 sends data to the application processor 4, the data processed in the signal processing apparatus 10 is stored to the register of the CPU interface $13_2$. Then the application processor 4 reads the data stored to the register. On the other hand in case the application processor 4 sends data to the signal processing control apparatus 10, the data sent from the application processor 4 is stored to the register of the CPU interface $13_2$. Then the blocks inside the signal processing control apparatus 10 reads the data stored to the register and stores the data to the register of their blocks.

The control register $13_3$ stores data regarding power supply status of the signal processing control apparatus (power supply control instruction POW_CNT) that is sent from the application processor 4, for example. The power supply control circuit 12 generates power supply to be provided to each block according to the data stored to the control register $13_3$. Relationship between the power supply provided to each block and operation of each block is explained later in detail.

The control circuit 14 includes a path control circuit (CPU) $14_1$, ROM (Read Only Memory) $14_2$. The path control circuit $14_1$ controls path of data sent/received in the signal processing control apparatus 10 according to the data sent from the application processor 4 through the host interface 13 and the internal bus IB1. The signal processing control apparatus 10 includes three internal data paths, for example. The paths are: memory access mode for connecting the storage control circuit 17 and the application processor 4 through the host interface 13 and the internal bus IB1, DSP mode for connecting the audio processing circuit 15 and the application processor 4 through the host interface 13 and the internal bus IB1, and stand-alone mode for connecting the storage control circuit 17 and the audio processing circuit 15 through the internal bus IB2. The path control circuit $14_1$ directs these modes to the storage control circuit 17 and the audio processing circuit 15 through the internal bus IB2. These modes are described later in detail.

The ROM $14_2$ stores control soft (hereinafter referred to as a firmware) necessary to operate the signal processing control apparatus 10. The firmware is for example an initial value for a register to startup the signal processing control apparatus 10, and a process definition file (hereinafter referred to as codec) regarding compression format necessary for the audio processing circuit 15 to decompress compressed audio data. In this embodiment only a small number of codecs are prepared in the ROM $14_2$. The prepared codecs are for example music data format for encoding and storing data in light of memory card specification. This allows necessary capacity for the ROM $14_2$ to be smaller.

The audio processing circuit 15 includes a RAM (Random Access Memory) $15_1$, a stream buffer $15_2$, and a DSP (Digital Signal Processor) $15_3$. The RAM $15_1$ stores a firmware used by the DSP $15_3$ and codecs (hereinafter referred to as firmware and the like). The firmware and the like are downloaded from the ROM $14_2$ or the application processor 4 through the internal bus IB2. The stream buffer $15_2$ has a FIFO (First In First Out) function that outputs input data in an order of input). The stream buffer $15_2$ stores audio data processed by the DSP $15_3$.

The DSP $15_3$ is a functional unit to process audio data. The DSP $15_3$ decodes compressed data (encoded data) according to the firmware and the like stored in the RAM $15_1$. The DSP $15_3$ of this embodiment is capable of processing a decoding on a previously specified compressed format by hardware. In case of encoding by software, various types of compressed format can be encoded by changing software. However in that way, the software must be executed in addition to the decoding process. Thus a high computational capacity is required and power consumption in the DSP increases. On the other hand in case the decoding process is performed by hardware, only input data needs to be decoded. Accordingly if compression format of the audio data input previously can be predicted, performing the encoding process by hardware eliminates unnecessary calculation and also decreases power consumption of the DSP $15_3$.

The audio interface 16 is an input/output interface capable of performing data communication in compliant to $I^2S$ (Inter-IC Sound) standard that is used to send/receive audio data, for example. In the $I^2S$ standard, audio data is sent/received in synchronization with bit clock BCLK, and switch to the audio data for left channel with the audio data for right channel by synchronizing the channel switch clock LRCLK. In this embodiment, the audio interface 16 receives the bit clock BCLK and the channel switching clock LRCLK, and synchronizes with the clock signal to send the audio data generated in the DSP 15₃ to the analog front-end 8. In the explanation below, a circuit for outputting the bit clock BCLK and the channel switching clock LRCLK is referred to as a master, and a circuit for receiving the bit clock BCLK and the channel switching clock LRCLK is referred to as a slave.

In this embodiment, the storage control circuit 17 controls writing and reading of data to/from the memory card 9. The data read out is sent to the application processor 4 through the internal bus IB1 or sent to the audio processing circuit 15 through the internal bus IB2. The data to be written is sent from the application processor 4 through the internal bus IB1. The memory card 9 of this embodiment stores data encoded for copyright protection, for example. The encoded data is decoded by the storage control circuit 17. The storage control circuit 17 encodes the data when writing the data to the memory card 9. The encoded data is written to the memory card through the storage interface 18. The storage control circuit 17 is activated and deactivated according to the reset signal MEM_RSTB input externally.

The storage interface 18 operates according to the power supply MEMVDD that is supplied externally and also used as a power supply for the memory card. The storage interface 18 relays data between the memory card and the storage control circuit 17. At this time, the storage interface 18 level shifts signal amplitude of data to be relayed. For example the storage interface 18 converts the signal amplitude of data to be read from the memory card into a signal amplitude based on the operating power supply voltage DVDD of the signal processing control apparatus 10. For a writing data, reversed conversion to the reading data is performed.

A voltage generated by the power supply control circuit 12, particularly control timings of each power supply is explained hereinafter in detail. Power supplies input externally are explained first. In this embodiment, the power supplied input externally are EVDD, MEMVDD, DVDD, and PLLVDD. Voltage values of the power supplies are configured according to the blocks that are supplied with the power supplies. In this embodiment, the power supply MEMVDD is a voltage configured in compliant with the specification of the memory card 9. The voltage value will approximately be 1.8V to 3.3V. On the other hand the power supply EVDD is configured according to the power supply voltage that the application processor 4 and the peripheral circuits. The voltage value will approximately be 1.8V. The power supplies DVDD and PLLVDD are power supplies that the signal processing control apparatus 10 operates. The voltage value will approximately be 1.2V. In this embodiment, by having lower power supply voltages to main blocks of the signal processing control circuit 10 than the power supply voltages to the peripheral circuits, it is possible to lower the power consumption of the signal processing control apparatus 10.

Startup procedure of each power supply is explained hereinafter in detail. The power supply EVDD is started before the power supplies DVDD and PLLDVDD, because the power supply EVDD is a power supply for terminals. Further, problems such as a shoot through current is generated between blocks and the signal processing control apparatus 10 goes beyond control occur in case the power supply EVDD is started before the power supplies DVDD and PLLVD. The power supply MEMVDD can be started before the power supplies DVDD and PLLVDD because the power supply MEMVDD operates in response to an insert of the memory card 9. There is no restriction in a startup order between the power supply EVDD and the MEMVDD. In the explanation below, it is assumed that the power supplies EVDD and MEMVDD are started before the power supplies DVDD and PLLVDD.

The power supply DVDD is a reference power supply voltage supplied to the blocks in the signal processing control apparatus 10. The clock generation circuit 11 operates according to a start up of the power supply PLLVDD. That is, a voltage or a signal to be a reference for the signal processing control apparatus 10 to operate is generated according to the power supplies DVDD and PLLVDD. Accordingly the power supplies DVDD and PLLVDD are preferably started at the same time to prevent operation failure. In the explanation below, a case is explained where the power supplies DVDD and PLLVDD are started at the same time.

Figure 4:
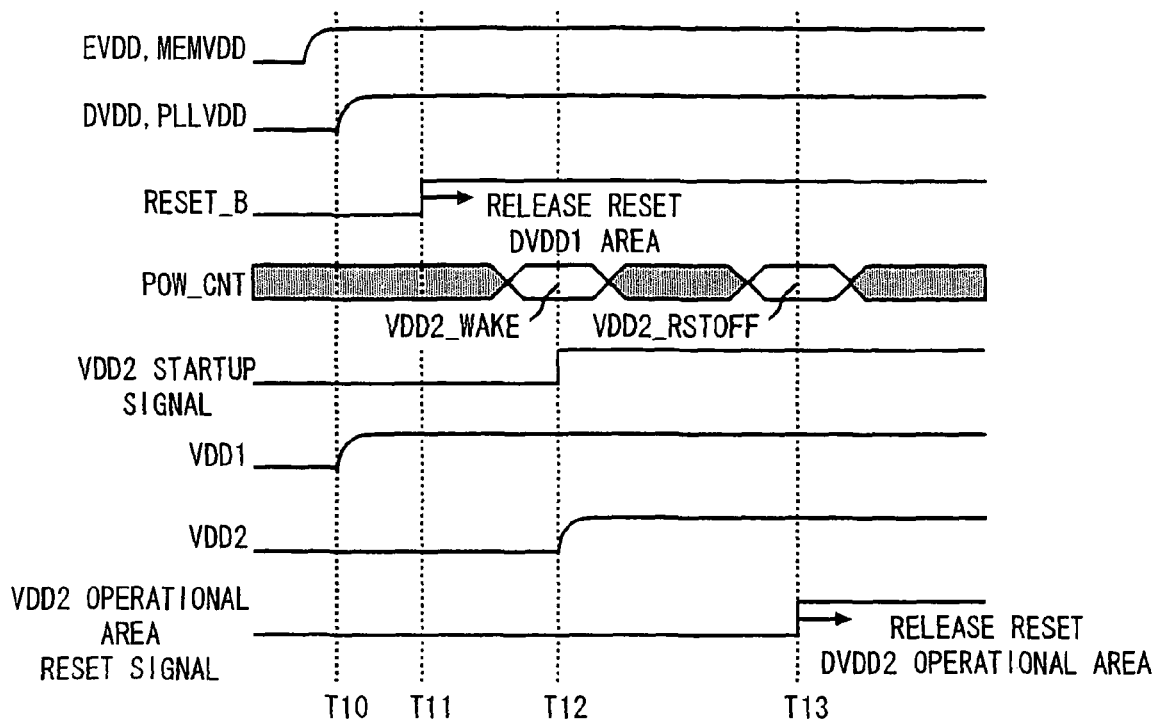
FIG. 4 is a timing chart showing a startup procedure of a power supply DVDD, PLLVDD, DVDD1, and DVDD2 of a signal processing control apparatus of the first embodiment.

FIG. 4 is a timing chart showing a procedure of the power supplies DVDD, PLLVDD, DVDD1, and DVDD2. As shown in FIG. 4, when the power supplies DVDD and PLLDVDD rise at timing T10, the power supply DVDD1 rises in response. When the power supply DVDD1 has sufficient voltage, the reset signal RESET_B rises from low to high level at timing T21. In response to a rise of the reset signal RESET_B, reset of the host interface 13 is released and the host interface 13 starts operating. By the host interface 13 start operating, the application processor 4 is enabled to control the signal processing control apparatus 10 according to data through bus lines.

Then at timing T12, the application processor 4 outputs a power supply startup signal DVDD2_Wake. In response to the power supply startup signal DVDD2_Wake, a DVDD2 startup signal sent to the power supply control circuit 12 rises from low to high level. An output from the power supply DVDD 2 is started in response to the rise of the DVDD2 startup signal.

Then at timing T13 where the power supply DVDD2 rises enough, the application processor 4 outputs an area reset release signal DVDD2_RSTOFF. In response to the area reset release signal DVDD2_RSOFF, a DVDD2 area reset signal that is sent to a block operating on the power supply DVDD2 rises from low to high level. Reset of the block operating on the power supply DVDD2 (for example the control circuit 14, the audio processing circuit 15, and the audio interface 16) is released in response to the rise of the DVDD2 area reset signal and start operating.

Figure 5:
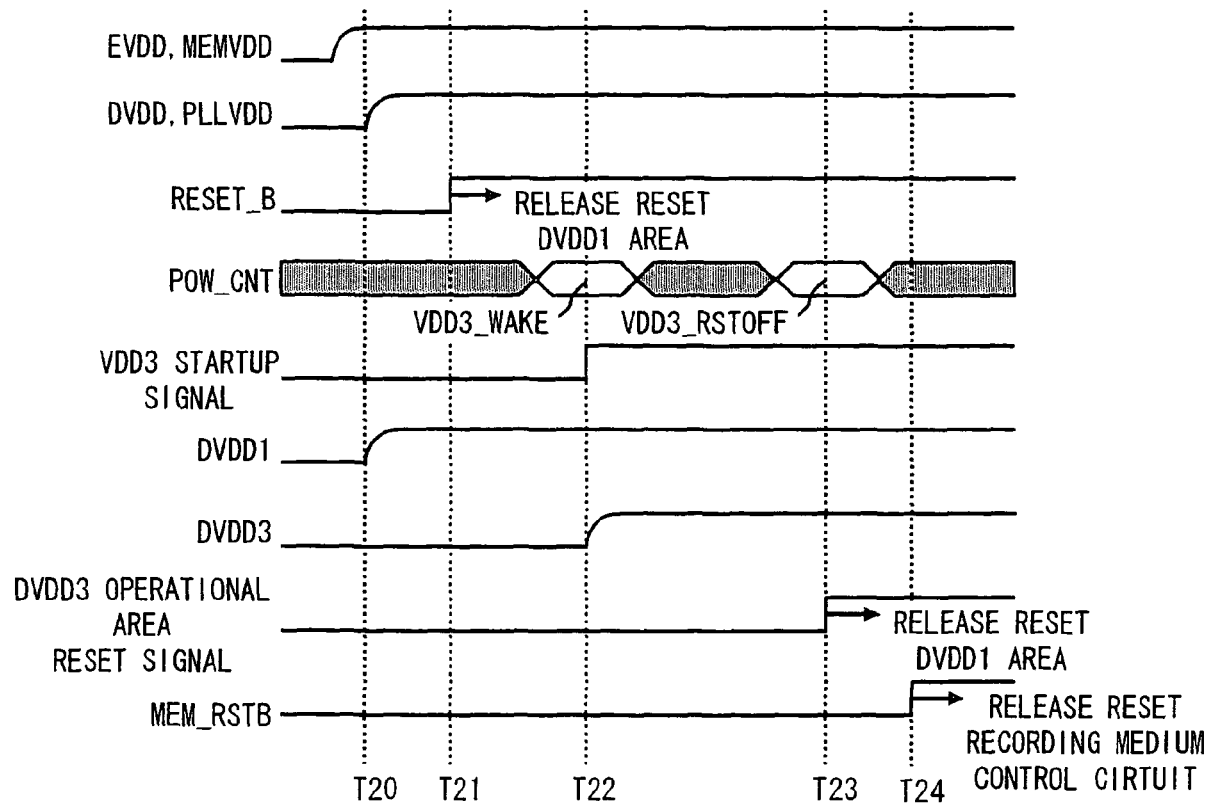
FIG. 5 is a timing chart showing a startup procedure of a power supply DVDD, PLLVDD, DVDD1, and DVDD3 of a signal processing control apparatus of the first embodiment.

FIG. 5 is a timing chart showing a start up procedure of the power supplies DVDD and PLLVDD, and the power supplies DVDD1 and DVDD3. As shown in FIG. 5, when the power supplies DVDD and PLLVDD rise at timing T20, the power supply DVDD1 rises. After the power supply DVDD1 becomes enough voltage, a reset signal RESET_B rise from low to high at timing T21. In response to the rise of the reset signal RESET_B, reset of the host interface 13 is released and the host interface 13 starts operating. By the host interface 13 start operating, the application processor 4 is enabled to control the signal processing control apparatus by data through bus lines.

Then at timing T22, the application processor 4 outputs a power supply startup signal DVDD3_Wake. A DVDD3 start up signal sent to the power supply control circuit 13 rises from low to high level in response to the power supply startup signal DVDD3_Wake. Output of the power supply DVDD3 is started in response to the rise of the DVDD3 startup signal.

Then at timing T23 where the power supply DVDD3 rises enough, the application processor 4 outputs an area reset release signal DVDD3_RSTOFF. A DVDD3 area reset signal that is sent to a block operating on the power supply DVDD3 rises from low to high level in response to the area reset release signal DVDD3_RSTOFF. Reset of the block operating on the power supply DVDD3 (for example the storage control circuit 17) is released by the rise of the DVDD3 area reset signal. The storage control circuit 17 is controlled to be reset or stopped state based on the reset signal MEM_RSTB input externally. Accordingly the storage control circuit 17 starts operating in response to the rise of the reset signal MRM_RSTB at timing 24 after the timing T23.

In this embodiment, there is no restriction in startup order between the power supply DVDD2 and DVDD3. A circuit such as a barrier gate is provided between a area operating on the power supply DVDD2 and the area operating on the power supply DVDD3. The barrier gate is prevents logic of a connection to be unstable in case one side of the circuit to be connected is in stopped state, and also prevents a shoot through current to flow to a circuit in stopped state.

Figure 6:
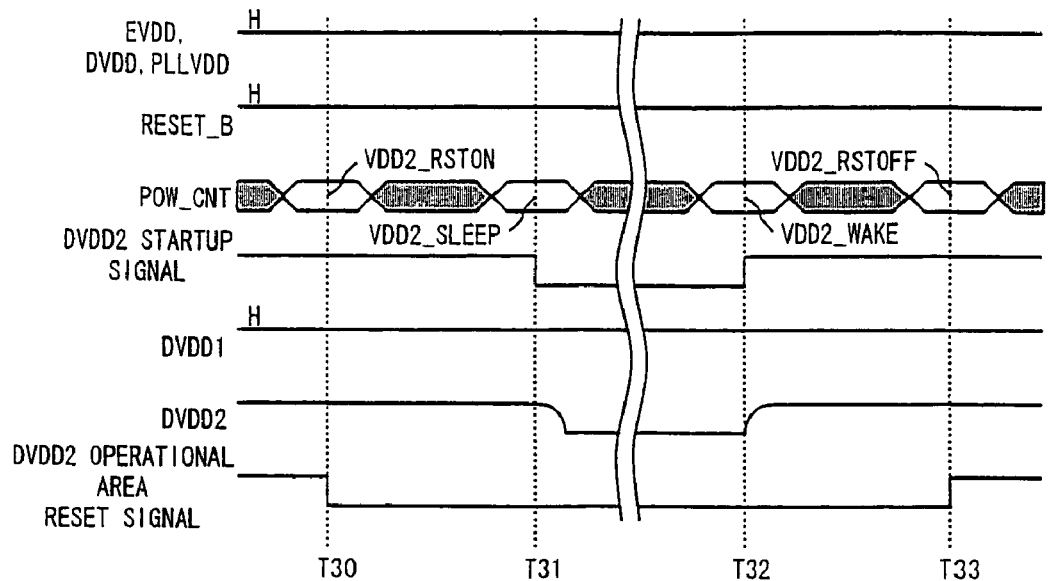
FIG. 6 is a timing chart of switching an output of the power supply DVDD2 while the signal processing control apparatus of the first embodiment is operating.

An operation of switching an output of the power supplies DVDD2 and DVDD3 while the signal processing control apparatus 10 is operating is explained hereinafter in detail. FIG. 6 shows a timing chart of switching an output of the power supply DVDD2 while the signal processing control apparatus 10 is operating. In this case, the power supplies EVDD, DVDD, PLLVDD, and DVDD1 remain to be operating and the reset signal RESET_B remains to be high level. In such a condition, an area reset signal VDD2_RSTON is sent from the application processor 4 at timing T30. The DVDD area reset signal falls from high to low in response to the area reset signal VDD2_RSTON. The block operating on the power supply DVDD2 becomes stopped state by the fall of the DVDD2 area reset signal. Then the application processor 4 sends a power supply stop signal DVDD2_Sleep at timing T31. The power supply control circuit 12 stops an output from the power supply DVDD2 in response to the power supply stop signal DVDD2_Sleep.

Then at timing T32 where the application processor 4 outputs the power supply startup signal DVDD2_Wake, the power supply control circuit 12 start outputting from the power supply DVDD2. Then at timing T33 where the power supply DVDD2 rises enough, the application processor 4 sends a release signal DVDD2_RSTOFF. The DVDD area reset signal rises from low to high level in response to the area reset release signal DVDD2_RSTOFF. The block operating on the power supply DVDD2 starts operating by the rise of the DVDD2 area reset signal.

Specifically, in case of switching the output of the power supply DVDD2 while the signal processing control apparatus 10 is operating, it is carried out while the block operating on the power supply DVDD2 is in stopped state.

Figure 7:
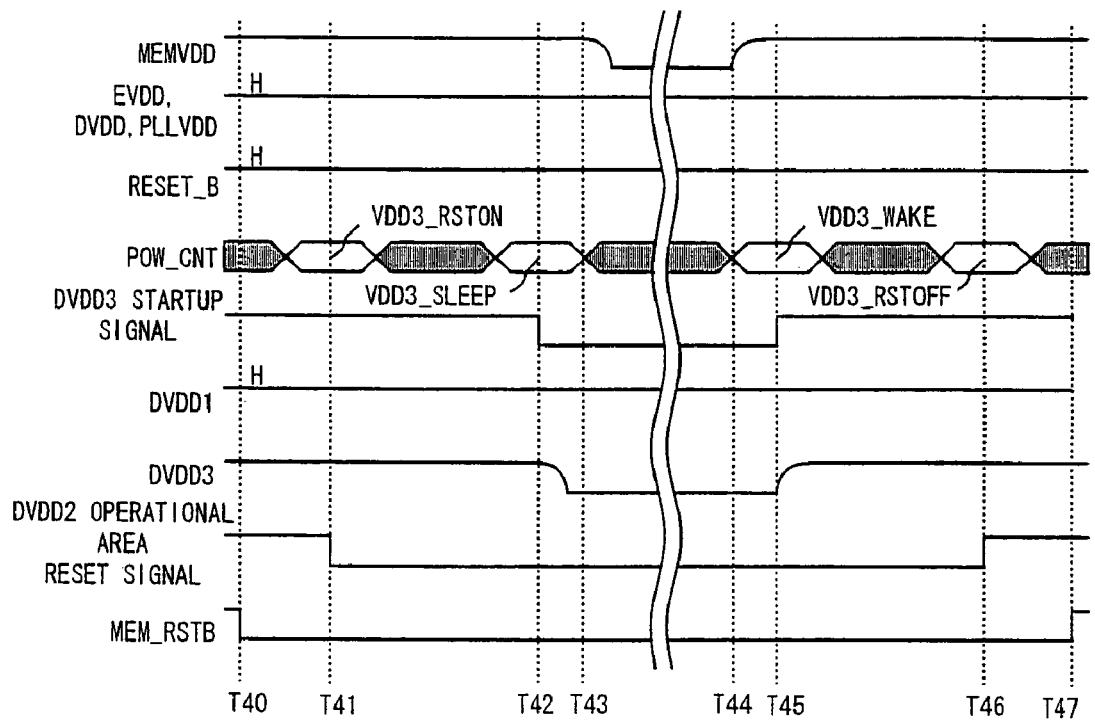
FIG. 7 is a timing chart of switching an output of the power supply DVDD3 and MEMVDD while the signal processing control apparatus of the first embodiment is operating.

FIG. 7 is a timing chart of switching outputs of the power supplies DVDD3 and MEMVDD while the signal processing control apparatus 10 is operating. In this case, the power supplies DVDD, DVDD, PLLVDD, and DVDD1 remain to be operating and the reset signal RESET_B remains to be high level. In such a condition, the reset signal MEM_RSTB falls from high to low level at timing T40. The storage control circuit 17 becomes to be stopped state by the fall. After that, an area reset signal VDD3_RSTON is sent from the application processor 4 at timing T41. The DVDD3 area reset signal falls from high to low in response to the area reset signal VDD3_RSTON. The block operating on the power supply DVDD3 becomes to be reset state by the fall of the DVDD3 area reset signal. A DVDD3_Sleep is sent from the application processor 4 at timing T42. The power supply control circuit 12 stops an output from the power supply DVDD3 in response to the power supply stop signal DVDD3_Sleep. By the fall of the power supply DVDD3, the power supply MEMVDD can be stopped at timing T43.

Then at timing T44, the power supply MEMVDD is started to be supplied. At timing T45 where the power supply MEMVDD rises enough and the application processor 4 outputs a power supply startup signal DVDD3_Wake, the power supply control circuit 12 start outputting from the power supply DVDD3. Then at timing T45 where the power supply DVDD3 rises enough, the application processor 4 sends an area reset release signal DVDD3_RSTOFF. The DVDD3 area reset signal rises from low to high level in response to the area reset release signal VDD3_RSTOFF. After that at timing T47, by the rise of the reset signal MEM_RSTB from low to high level, the storage control circuit 17 starts operating.

Therefore, in case the reset signal externally input to the block operating on the power supply DVDD3 is the MEM_RSTB, the power supply DVDD3 can be stopped while the reset signal MEM_RSTB is in reset state. The power supply DVDD3 must be stopped while the DVDD area reset signal is in reset state. The power supply MEMVDD is stopped while the power supply to the block connected to the block operating on the power supply MEMVDD is suspended.

Figure 8:
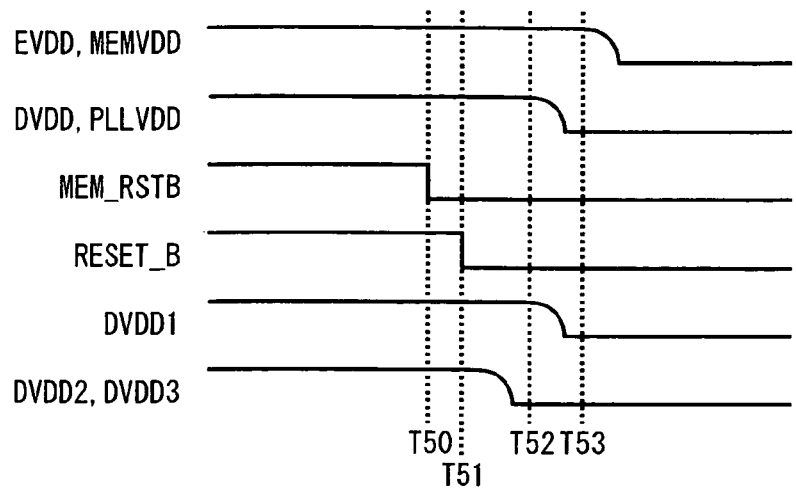
FIG. 8 is a timing chart of stopping power supplies of the signal processing control apparatus of the first embodiment.

A startup procedure of each power supply is explained hereinafter in detail. FIG. 8 shows a timing chart of stopping each power supply. As shown in FIG. 8, the reset signal MEM_RSTB falls at timing T50 and the storage control circuit 17 becomes to be stopped state. Then the reset signal RESET_B falls at timing T51, and the host interface 13 is stopped state. The power supplies DVDD2 and DVDD3 stop by the fall of the reset signal RESET_B. Stopped state settings that are set by reset signals input externally is completed. There is no restriction in an order of the falls of the reset signals MEM_RSTB and RESET_B. The signals may fall in reversed order of the order described above.

Then at timing T52, the power supplies DVDD and PLLVDD fall. The power supply DVDD1 falls in response to the fall of the power supply DVDD. At timing T53 where the power supply DVDD falls enough, the power supplies MEMVDD and EVDD fall. There is no restriction in the order of the fall of the power supplies DVDD and PLLVDD as long as the reset signal is low level. Accordingly, the power supplies DVDD and PLLVDD can fall regardless of the above order.

According to the above explanation, the signal processing control apparatus 10 of this embodiment is capable of supplying power to only the blocks to be used and reduces current consumption to unused blocks, because power supplies can be controlled independently. The signal processing control apparatus 10 includes a plurality of modes depending on the state of the power supply and difference in data paths.

Figure 9:
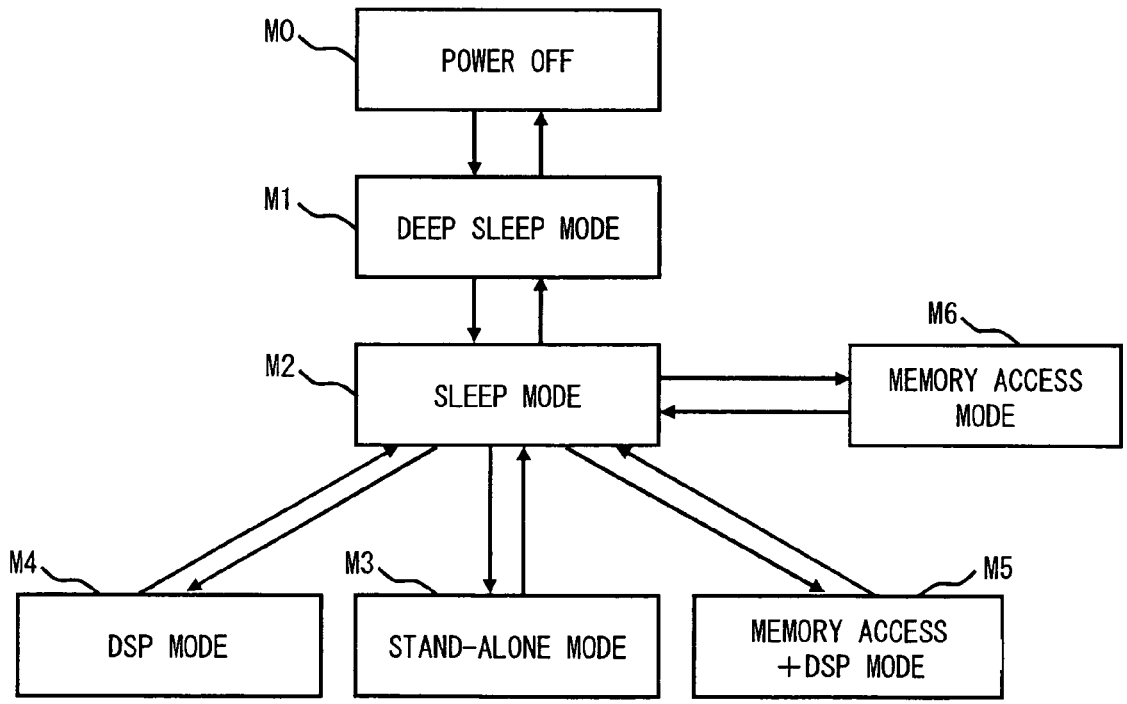
FIG. 9 is a state transition diagram of an operation mode of the signal processing control apparatus of the first embodiment of and an operation mode thereof.

FIG. 9 is a state transition diagram showing an operation mode of the signal processing control apparatus 10 of according to the first embodiment. As shown in FIG. 9, the signal processing control apparatus 10 of this embodiment includes a power OFF mode M0, a deep sleep mode M1, a sleep mode M2, a first mode (for example a stand-alone mode M3), a third mode (for example DSP mode M4, a second mode (for example a memory access+DSP mode M5), and a fourth mode (for example a memory access mode M6). FIG. 10 shows a state of the power supplies in these modes.

As shown in FIG. 10, the power OFF mode M0 is a state where all the power supplies to the signal processing control apparatus 10 are stopped. The deep sleep mode M1 is a state where only the power supply EVDD is supplied and input/output terminals of the signal processing control apparatus 10 are operating. To be specific, in this deep sleep mode M1, the application processor 4 is electrically connected with the signal processing control apparatus 10 but no data is sent/received.

The sleep mode M2 is a state where the power supplies EVDD, DVDD, and PLLVDD are supplied and only the power supply DVDD1 is operating. To be specific, in the sleep mode M2, the signal processing control apparatus 10 is able to receive data from the application processor 4 but no data is processed.

The stand-alone mode M3 is a state where all the power supplies to the signal processing control apparatus 10 are supplied and all the functions of the signal processing control apparatus 10 can be used. Specifically, reading audio data from the memory card and playing the audio data can be performed by only the signal processing control apparatus 10. In this case, the power supply of the application processor 4 may be stopped or operating.

The DSP mode M4 uses functions (for example DSP function) regarding the audio processing circuit 15 among the functions of the signal processing control apparatus 10. In this case, functions of the storage control circuit 17 are not necessary, thus the power supplies DVDD 3 and MEMVDD may be stopped. The audio data processed by the audio processing circuit 15 is sent from the application processor 4.

The memory access+DSP mode M5 uses functions regarding the storage control circuit 17 of the signal processing control apparatus 10 (for example memory access function) and the DSP function. Data read from the memory card is sent/received through a path going through the application processor 4. Accordingly in the memory access+DSP mode M5, all the power supplies to the application processor 4 and the signal processing control apparatus 10 are supplied.

The memory access mode M6 uses the memory access function of the signal processing control apparatus 10 and does not use the DSP function. Accordingly the power supply DVDD2 of the signal processing control apparatus 10 is stopped, and other power supplies are supplied. That is, the memory access mode M6 is used in case the application processor 4 uses the signal processing control apparatus 10 as an interface with the memory card.

Power supply states in the abovementioned modes and the signal processing control apparatus 10, and data path are explained hereinafter with reference to block diagrams of the signal processing control apparatus 10 and peripheral apparatuses thereof. The signal processing control apparatus 10 is practically not operating in the power OFF mode M0 and M1, thereby omitting the explanation.

Figure 11:
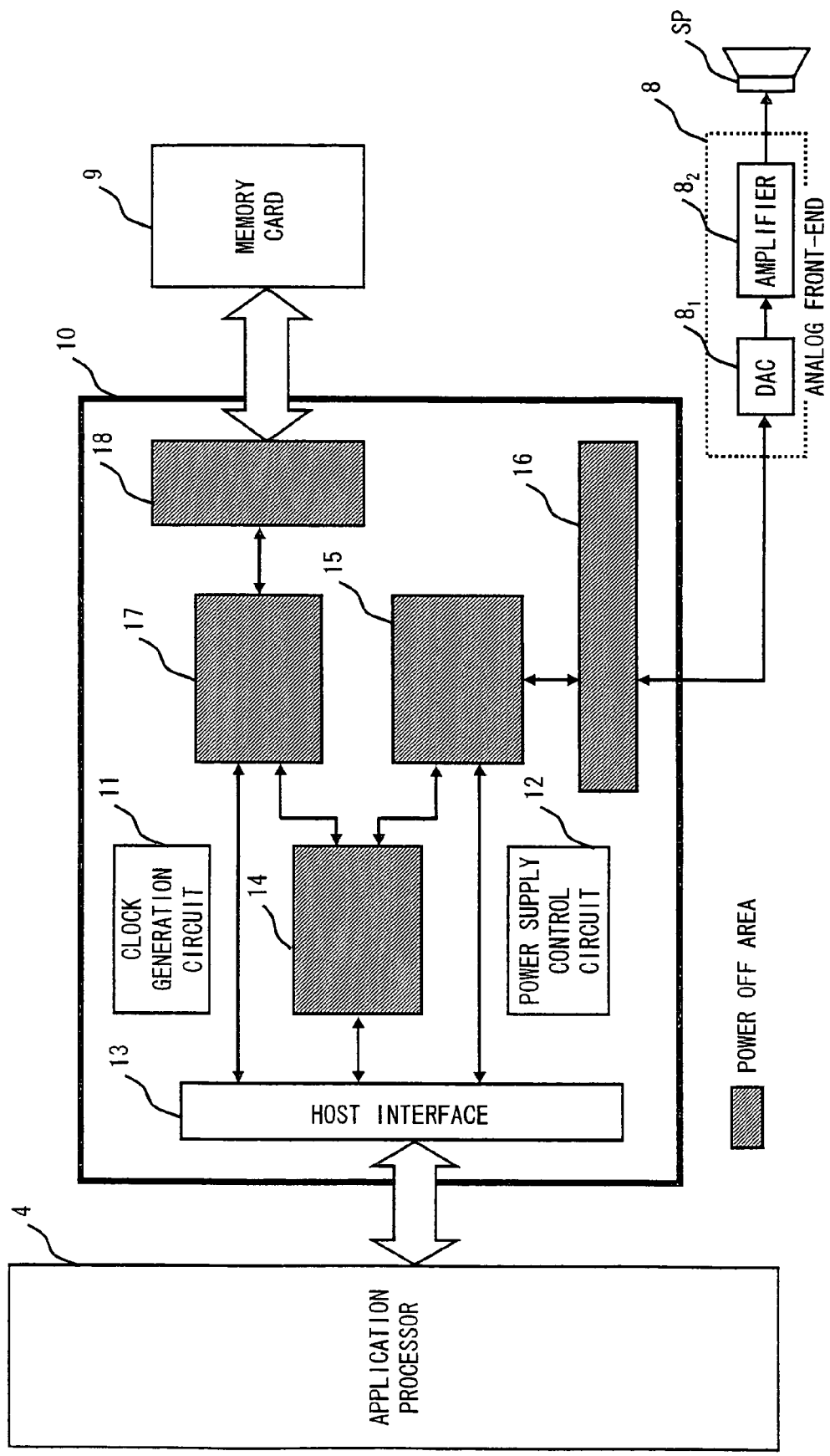
FIG. 11 is a view showing a power supply status when the signal processing control apparatus of the first embodiment is in sleep mode.

FIG. 11 shows power supply state of the signal processing control apparatus 10 and peripheral apparatuses thereof in the sleep mode M2. As shown in FIG. 11, the power supply control circuit 12 that operates on the power supply DVDD, the clock generation circuit 11 that operates on the power supply PLLVDD, and the host interface 13 that operates on the power supply DVDD1 are operating among the signal processing control apparatus 10. On the other hand the control circuit 14, the audio processing circuit 15, the audio interface 16 that operates on the power supply DVDD2, the storage control circuit 17 that operates on the power supply DVDD3 and the storage interface 18 that operates on the power supply MEMVDD are stopped.

Figure 12:
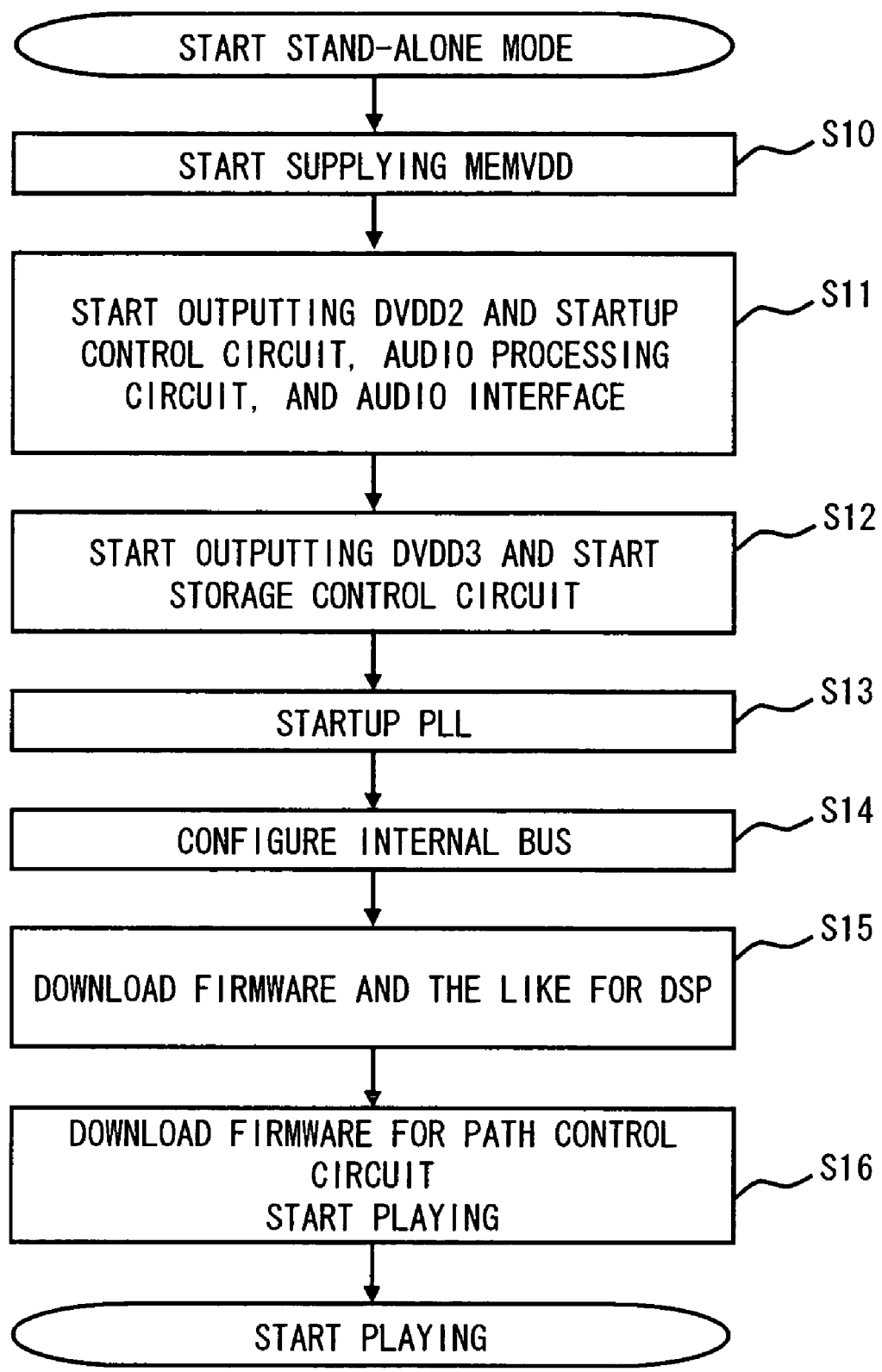
FIG. 12 is a flowchart showing a procedure for a signal processing control apparatus of the first embodiment to change from sleep mode to stand-alone mode.

A procedure of changing from the sleep mode M2 to the stand-alone mode M3 is explained hereinafter in detail. As shown in FIG. 12, in this case, the power supply MEMVDD is supplied first and the storage interface 18 is started (step S10). Then an output from the power supply DVDD2 is started, and the control circuit 14, the audio processing circuit 15, and the audio interface 16 are started (step S11). After that, an output from the power supply DVDD3 is started and the storage control circuit 17 is started (step S12). Then frequency of a clock generated by the clock generation circuit 11 is configured (step S13). This enables each blocks started in the steps S11 and S12 to start operating at a specified speed.

After the step S13 is completed, the control circuit 14 configures operational speed of internal buses (step S14). The configuration of the operational speed of the internal buses is described later in detail. After the step S14, the firmware and the like for the DSP $15_3$ to operate are downloaded to the RAM $15_1$ (step S15). Then firmware for the path control circuit $14_1$ to operate is downloaded (step S16). The signal processing control apparatus 10 is started to operate after that.

Only the firmware and the like necessary to operate the signal processing control apparatus 10 are downloaded in the steps S15 and S16. In case the firmware and the like downloaded to $15_1$ is stored to the ROM $14_2$, the firmware and the like are preferentially downloaded. On the other hand in case the firmware and the like are not stored to the ROM $14_2$, it is downloaded from the application processor 4. For the firmware downloaded to the path control circuit $14_1$, in case the firmware id stored to the ROM $14_2$, the firmware and the like are preferentially downloaded from the ROM $14_2$.

The configuration of the operational speed of the internal buses in the step S16 is described hereinafter in detail. The DSP $15_3$ of this embodiment is capable of changing operational speed depending on compression format of audio data to be executed. Accordingly in case data is sent/received through the internal bus IB2, operational speed of the storage control circuit 14 and DSP $15_1$ differs. The configuration of the operational speed of the internal buses is performed to achieve sending/receiving data between circuits having different operational speeds.

Figure 13:
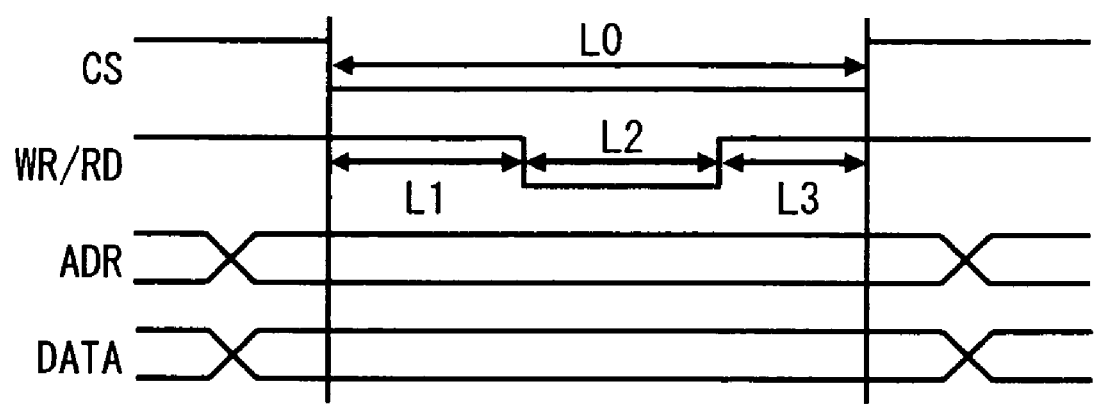
FIG. 13 is a view showing an example of a configuration of an internal bus that a control circuit of the first embodiment specifies.

In case the control circuit 14 sends/receives data through internal buses, a chip select signal CS is output to a sending circuit and a writing signal WR (or a reading signal RD) is output to a receiving circuit. The sending and receiving circuits sends and receives data according to the chip select signal and write signal or read signal. An example of a configuration of an internal bus by the control circuit 14 is shown in FIG. 13. In FIG. 13, the write signal WR (or the read signal RD) becomes low level for a specified period while the chip select signal CS is low level. The circuit to be connected sends/receives address data ADR and a data signal DATA in a period the write signal WR (or the read signal RD) is low level. The address data ADR and the data signal DATA are signals in the internal bus.

As shown in FIG. 13, in the step S13, position and period of low level of the write/read signals WR/RD in a period L0 where the chip select signal CS is low level are configured. The position and the period is configured by adjusting a period L1, which is the period from a fall of the chip select signal CS to a fall of the write/read signal WR/RD, a period L2, which is the period from the fall of the write/lead signal WR/RD to a rise, and a period L3, which is the period from the rise of the write/lead signal to a rise of chip select signal CS.

Figure 14:
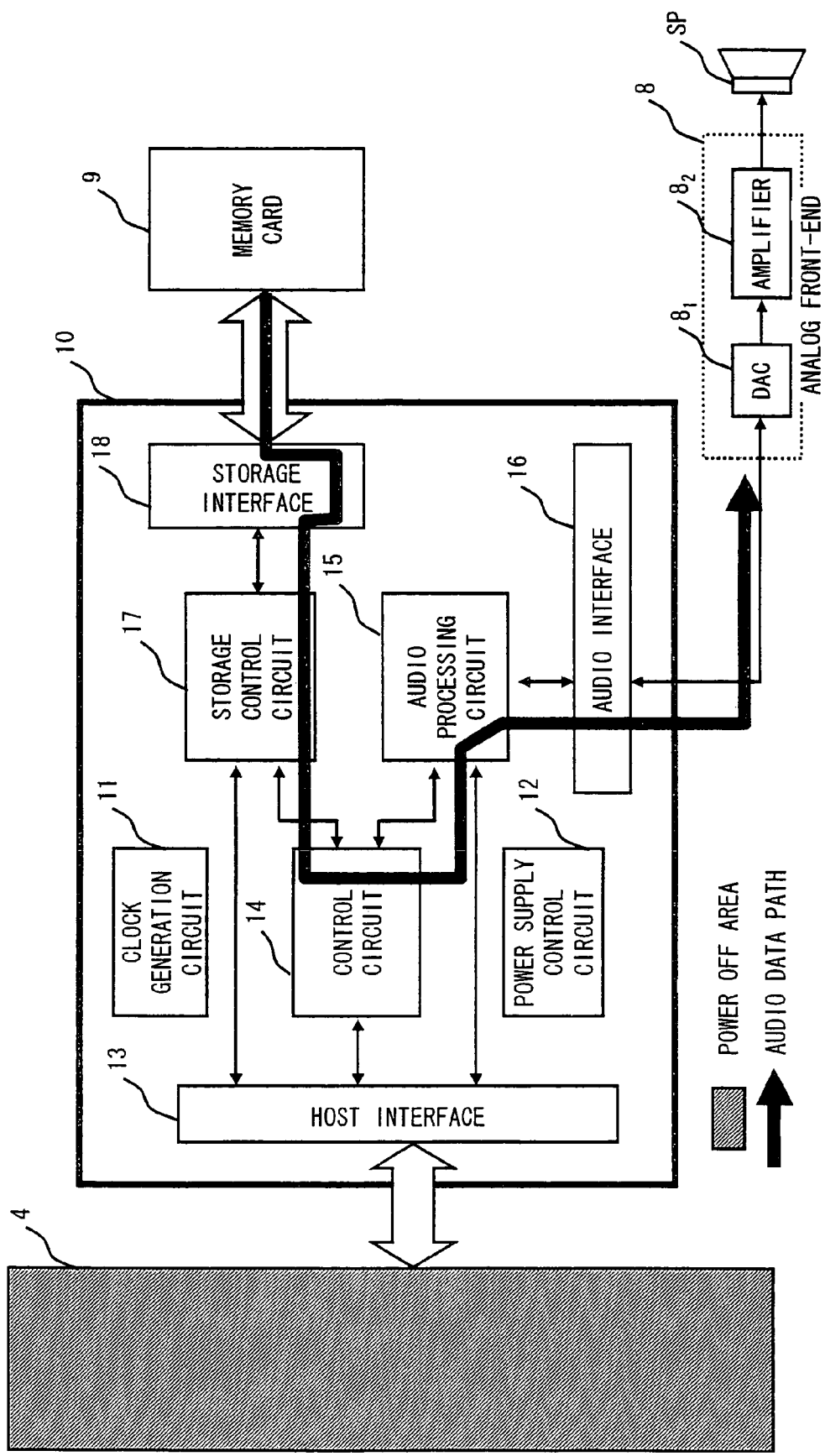
FIG. 14 is a view showing power supply state of the signal processing control apparatus of the first embodiment in stand-alone mode and audio data path.

FIG. 14 is a view showing power supply state of the signal processing control apparatus 10 and peripheral apparatuses thereof in the stand-alone mode M3 and path of audio data. The audio data is sent to the analog front-end 8 from the memory card 9 through the storage interface 18, the storage control circuit 17, the control circuit 14, the audio processing circuit 15, and the audio interface 16. That is, the audio data can be played without the application processor 4. In FIG. 14, the power supply of the application processor 4 is stopped status. However the power supply may be supplied to the application processor 4. Further, the application processor 4 starts up in response to a keypad 5 from stopped state to operate peripheral apparatuses.

In the stand-alone mode M3, the storage control circuit 17 reads the audio data to play from the memory card 9, decodes the code for the copyright protection, and outputs the decoded audio data. The control circuit 14 sends the audio data output from the storage control circuit 17 to the audio processing circuit 15. The audio processing circuit 15 stores the audio data sent from the control circuit 14 in the stream buffer $15_2$. Then the audio data stored to the stream buffer $15_2$ is sequentially decoded by the DSP $15_3$ and output through the audio interface 16.

Figure 15:
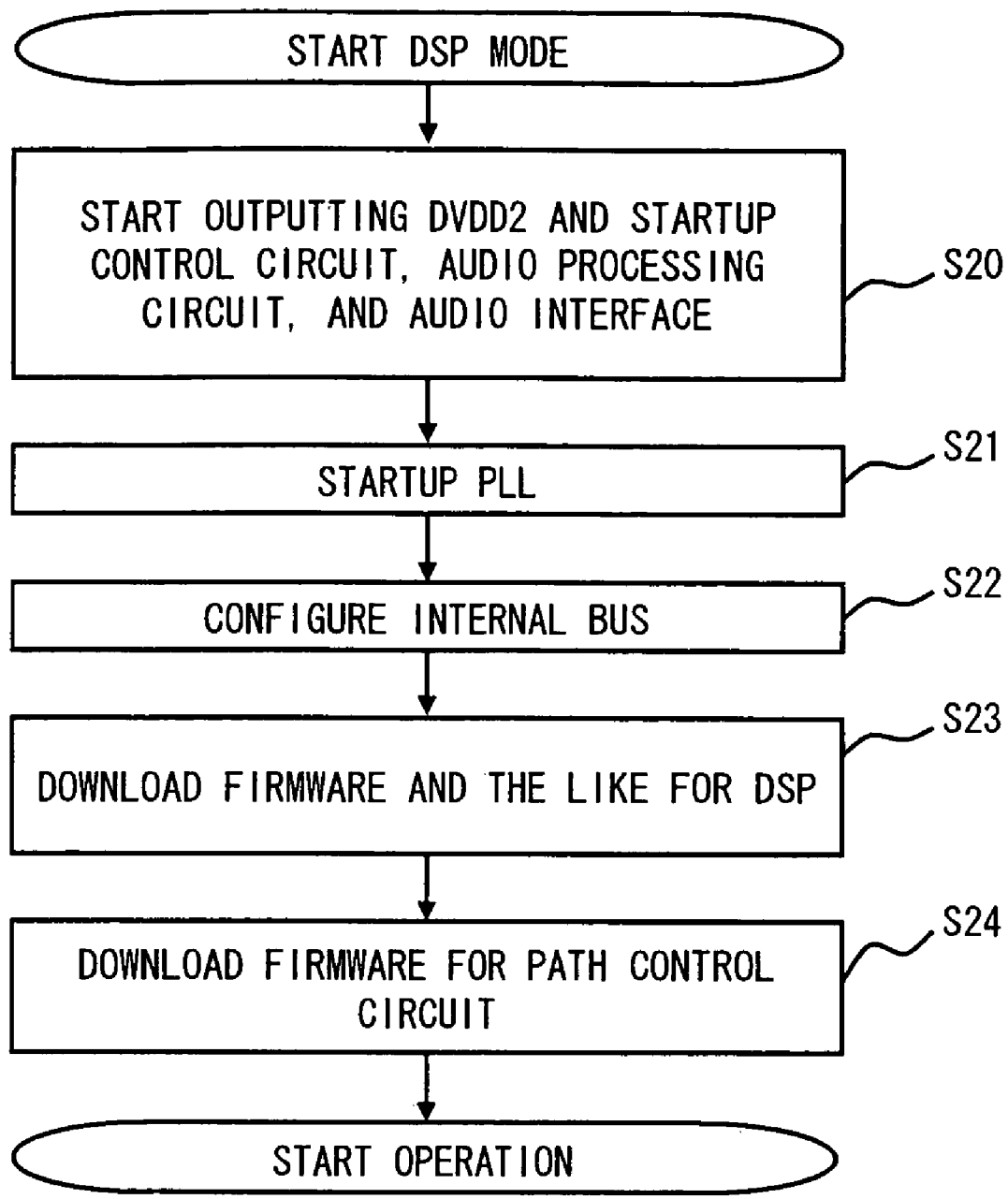
FIG. 15 is a flow chart showing a procedure of the signal processing control apparatus of the first embodiment to change from sleep mode to DSP mode.

A case of changing from the sleep mode M2 to the DSP mode M4 is explained hereinafter in detail. A flow chart of a procedure of changing from the sleep mode M2 to the DSP mode M4 is shown in FIG. 15. In this case, an output from the power supply DVDD2 is started first, then the control circuit 14, the audio processing circuit 15, and the audio interface 16 are started (step S20). After that, frequency of a clock generated by the clock generation circuit 11 is configured (step S21). Then the control circuit 14 configures internal buses (step S22). The step S22 corresponds to the step S14 shown in FIG. 12.

After the step S22, the firmware and the like for the DSP $15_3$ to operate are downloaded to the RAM $15_1$. Then the firmware for the path control circuit $14_1$ to operate is downloaded (step S24). Then the signal processing control apparatus 10 is started to operate. The steps S23 and S24 correspond to the steps S15 and S16 in FIG. 12.

Figure 16:
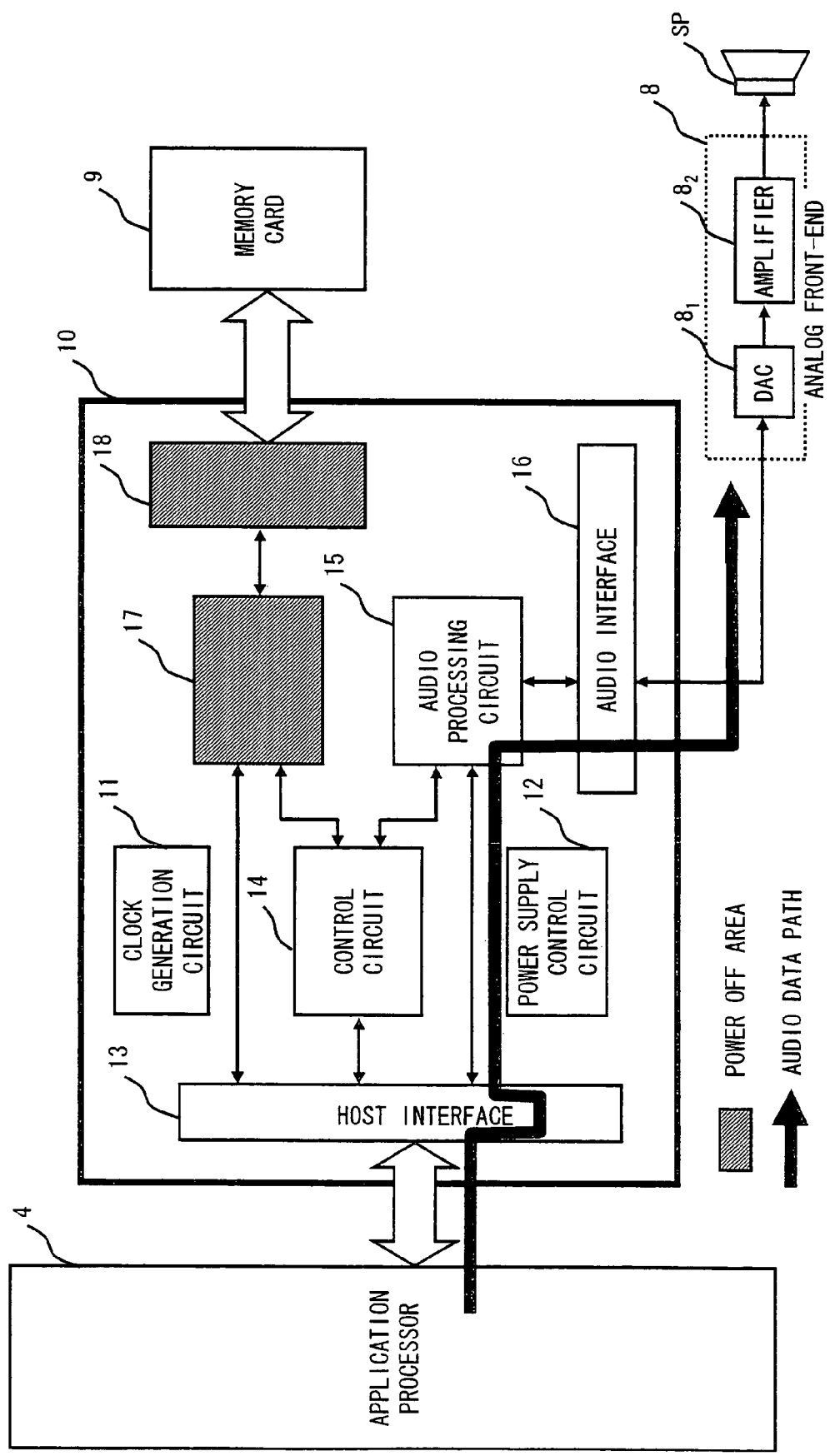
FIG. 16 is a view showing power supply state of the signal processing control apparatus of the first embodiment in DSP mode and audio data path.

Power supply status of the signal processing control apparatus 10 and peripheral apparatuses thereof and data path in the DSP mode M4 are shown in FIG. 16. As shown in FIG. 16, in the DSP mode M4, the storage control circuit 17 and the storage interface 18 among the blocks in the signal processing control apparatus 10 are stopped. Further the audio data is sent from the application processor 4 to the analog front-end 8 through the host interface 13, the control circuit 14, the audio processing circuit 15, and the audio interface 16. That is the audio data is output from the application processor 4 and the application processor 4 is capable of playing the audio data. In FIG. 16, the power supply of the storage interface 18 is stopped. However the power supply may be supplied to the storage interface 18. Further, in the DSP mode M6, audio data of some amount is sent at once and the data is accumulated to the stream buffer $15_2$. This enables the application processor 4 to stop longer.

In the DSP mode M4, the control circuit 14 sends the audio data input through the host interface 13 to the audio processing circuit 15. The audio processing circuit 15 stores the audio data sent from the control circuit 14 to the stream buffer $15_2$. Then the audio data stored to the stream buffer $15_2$ is sequentially decoded by the DSP $15_3$ to be output through the audio interface 16.

Figure 17:
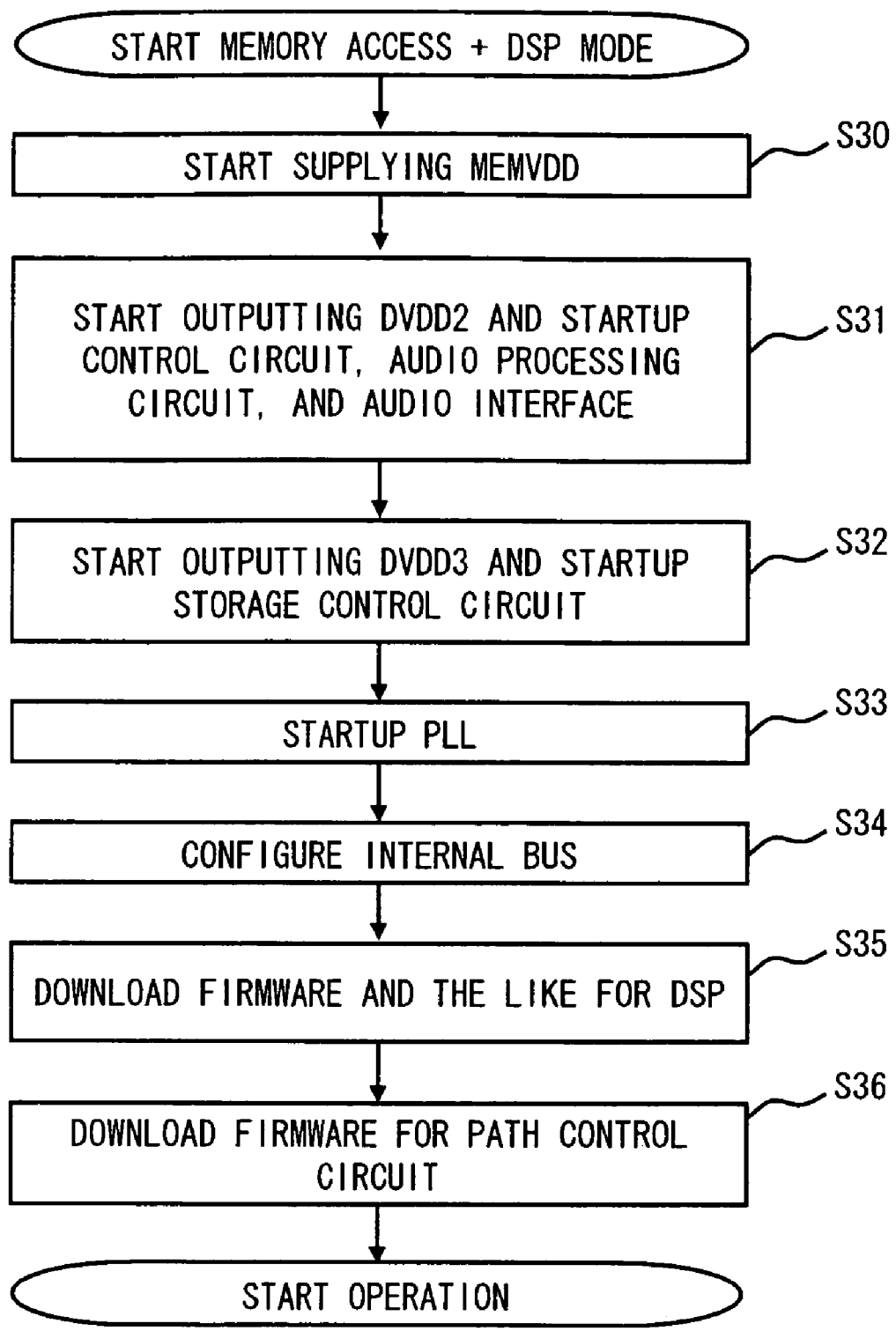
FIG. 17 is a flowchart showing a procedure of the signal processing control apparatus of the first embodiment to change from sleep mode to memory access+DSP mode.

A case of changing from the sleep mode M2 to the memory access+DSP mode M5 is explained hereinafter in detail. A flow chart of a procedure for changing from the sleep mode M2 to the memory access+DSP mode M5 is shown in FIG. 17. In this case, the power supply MEMVDD is supplied first to start the storage interface 18 (step S30). Then an output of the power supply DVDD2 is started, and the control circuit 14, the audio processing circuit 15, and the audio interface 16 are started (step S31). After that, an output of the power supply DVDD3 is started to start the storage control circuit 17 (step S32). After that, a frequency of a clock generated by the clock generation circuit 11 is configured (step S33). This enables each blocks started in the steps S31 and S32 to start operating at a specified speed.

After the step S33, the control circuit 14 configures operational speed of the internal buses (step S34). The step S34 corresponds to step S14 in FIG. 12. After the step S34, the firmware and the like for the DSP $15_3$ to operate are downloaded to the RAM $15_1$ (step S35). Then the firmware for the path control circuit $14_1$ of the control circuit 14 to operate is downloaded (step S36). The signal processing control apparatus 10 is started after that.

Figure 18:
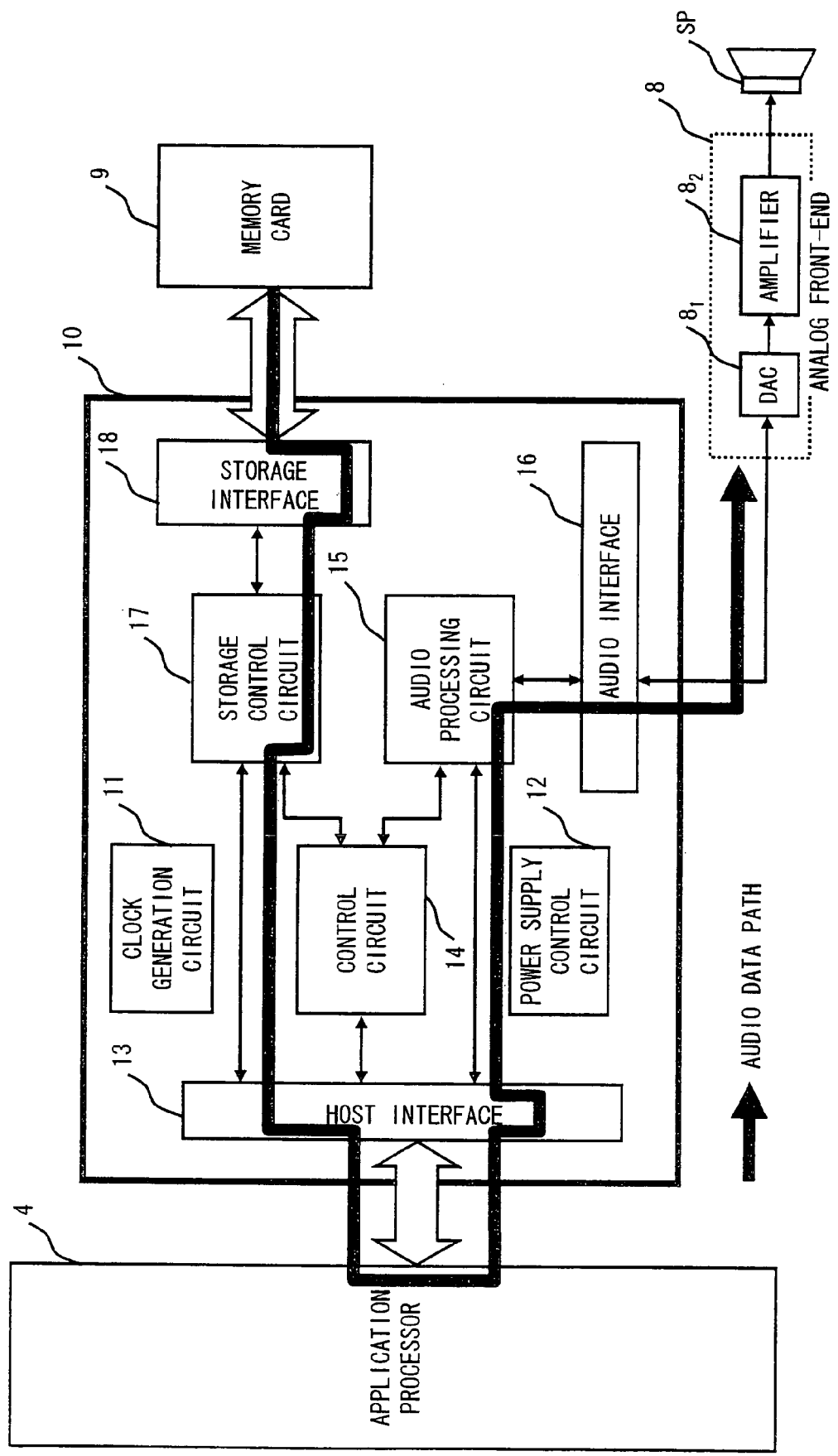
FIG. 18 is a view showing power supply state of the signal processing control apparatus of the first embodiment in memory access+DSP mode and audio data path.

Power supply state of the signal processing control apparatus 10 and peripheral apparatuses thereof, and audio data path in the memory access+DSP mode M5 is shown in FIG. 18. As shown in FIG. 18, all the blocks of the audio processing control apparatus 10 are supplied with power supplies. Further, the audio data is sent from the memory card 9 to the analog front-end through the storage interface 18, the storage control circuit 17, the host interface 13, the application processor 4, the control circuit 14, the audio processing circuit 15, and the audio interface 16. That is, the audio data is read from the memory card 9 and the application processor 4 can play the received audio data. Once the audio data is input to the application processor 4, the audio data is processed in the application processor 4 and the processed audio data can be played. The process performed by the application processor 4 in this case is a process that the signal processing control apparatus 10 cannot deal with. The process is for example a decoding of a code having a format that the storage control circuit 17 is unable to decode, or an addition of a special effect to the audio data.

In the memory access+DSP mode M5, the storage control circuit 17 reads the audio data to be played from the memory card 9, decodes code for copyright protection and outputs decoded audio data. The audio data output from the storage control circuit 16 is sent to the application processor 4 through the host interface 13. The application processor 4 performs processes that cannot be performed by the signal processing control apparatus 10 alone for the received audio data. After that, the processed audio data is sent to the audio processing circuit 15 through the host interface 13. The audio processing circuit 15 stores the audio data sent from the application processor 4 to the stream buffer $15_2$. The audio data stored to the stream buffer $15_2$ is sequentially decoded by the DSP $15_4$ and output through the audio interface 16.

Figure 19:
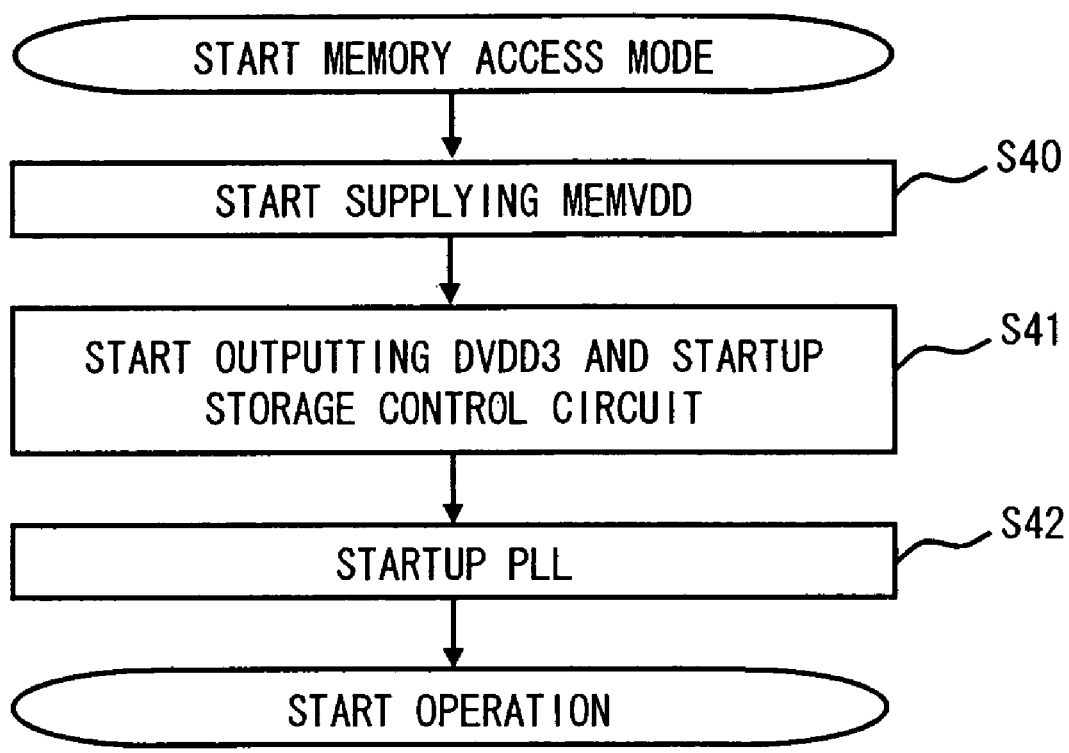
FIG. 19 is a flowchart showing a procedure of the signal processing control apparatus of the first embodiment to change from sleep mode to memory access mode.

A case of changing from the sleep mode M2 to the memory access mode M6 is explained hereinafter in detail. A flowchart of a procedure of changing from the sleep mode M2 to the memory access mode M6 is shown in FIG. 19. In this case, the power supply MEMVDD is supplied first to start the storage interface 18 (step S40). After that, an output of the power supply DVDD3 is started to start the storage circuit 17 (step S41). Then a frequency of a clock generated by the clock generation circuit 11 is configured (step S42). The signal processing control apparatus 10 is started to operate after that.

Figure 20:
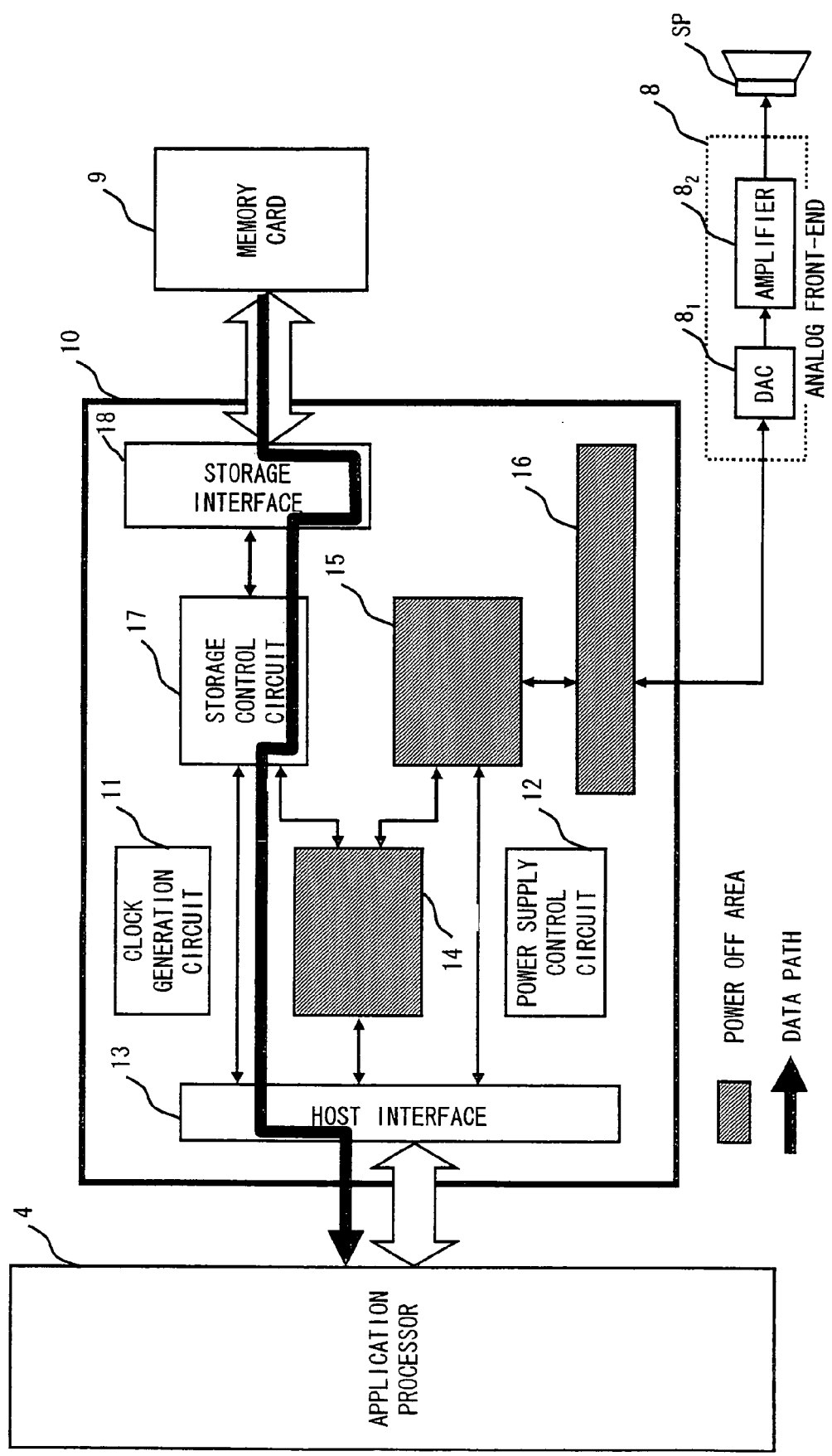
FIG. 20 is a view showing power supply state of the signal processing control apparatus of the first embodiment in memory access mode and data path.

Power supply state of the signal processing control apparatus 10 and peripheral apparatus thereof, and data path in the memory access mode M6 is show n in FIG. 20. As shown in FIG. 20, in the memory access mode M6, the control circuit 14, the audio processing circuit 15, and the audio interface 16 among the blocks of the signal processing control apparatus 10 are stopped. Further, the audio data is sent from the memory card 9 to the application processor 4 through the storage interface 18, the storage control circuit 17, and the host interface 13. That is, the memory access mode M6 is a mode to use the signal processing control apparatus 10 as a memory interface. This enables to use the memory card even in case the application processor 4 does not include memory interface. In this mode, data may be written to the memory card 9, not only reading data from the memory card 9. Data stored to the memory card 9 is not necessarily audio data, but may be moving or still image data. Data stored to the memory card 9 may not necessarily be encoded.

According to the signal processing control apparatus 10 of this embodiment, by using the stand-alone mode M3, audio data can be played even in case the application processor 4 is powered off. In case the application processor 4 is turned off, power consumption of overall device can be significantly reduced. On the other hand the signal processing control apparatus 10 is specialized in a playback function of audio data. Thus the power consumption of the signal processing control apparatus 10 is less than that of the application processor 4. Accordingly by the signal processing control apparatus 10 of this embodiment, music data can be played with lower power consumption as well as a music player for playing longer time can be achieved.

Further, by having the memory access mode M6, even in case the application processor 4 does not include the storage interface, the memory card can be accessed. This removes the storage interface provided to the application processor 4 conventionally, thereby reducing area needed to place the application processor 4. Therefore, the device size can be reduced.

Second Embodiment

Figure 21:
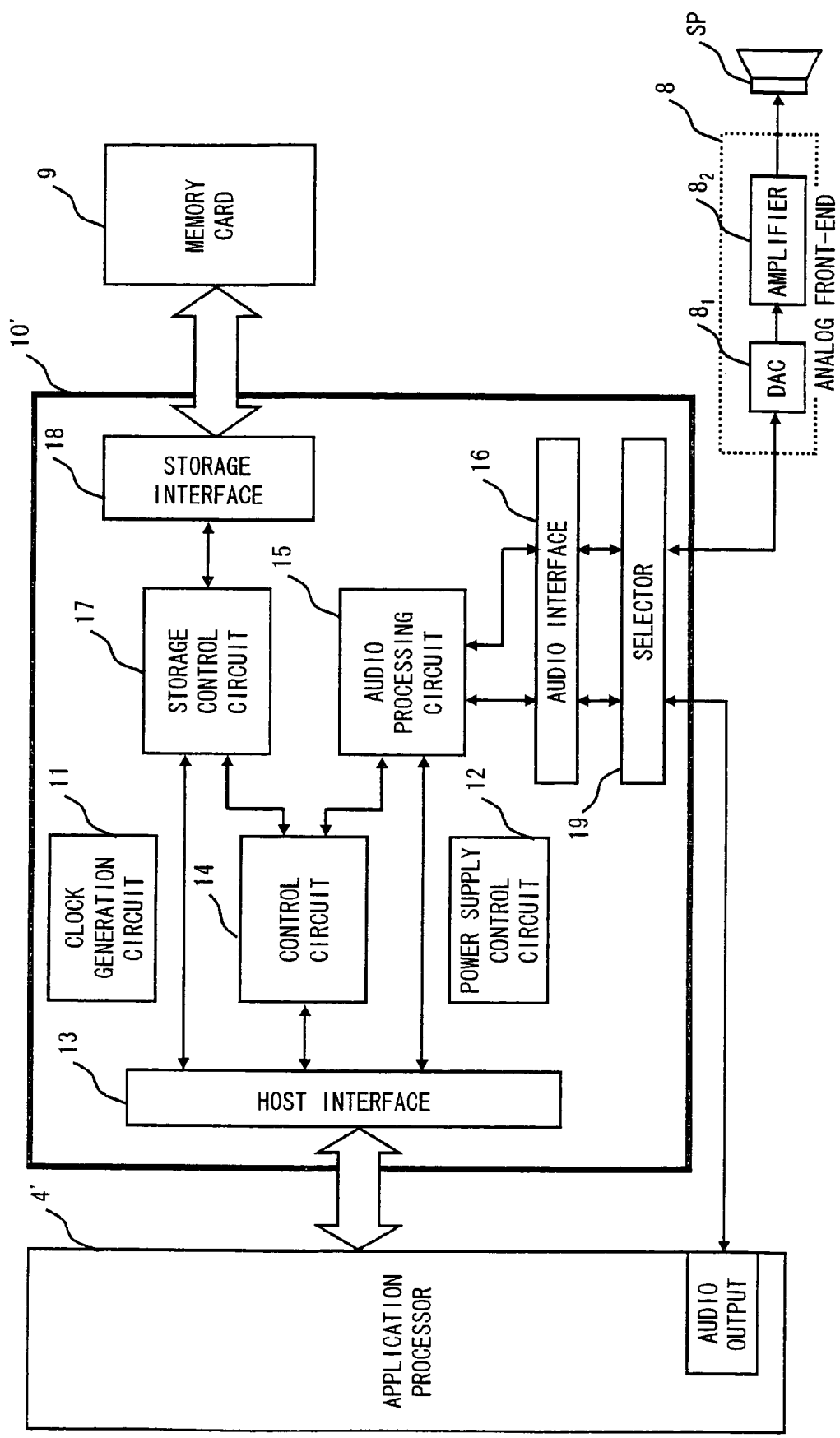
FIG. 21 is a block diagram showing a signal processing control apparatus of a second embodiment and peripheral apparatuses thereof.

A signal processing control apparatus 10' of a second embodiment includes a selector 19 in addition to the signal processing control apparatus 10. FIG. 21 is a block diagram showing the signal processing control apparatus 10' and peripheral apparatuses thereof. As shown in FIG. 21, the selector 19 is placed between the audio interface 16 and input/output terminal. Further, the application processor 4' of the second embodiment includes a audio output terminal. The audio output terminal is in compliant with I²S standard, for example.

The selector 19 sends audio data input from an input/output terminal selected among a plurality of input/output terminals, and outputs the audio data generated in the audio processing circuit 15 from an input/output terminal selected among a plurality of input/output terminals. For example the audio data input from the application processor 4 is sent to the audio processing circuit 15. The audio data processed in the audio processing circuit 15 is sent to the analog front-end 8.

Figure 22:
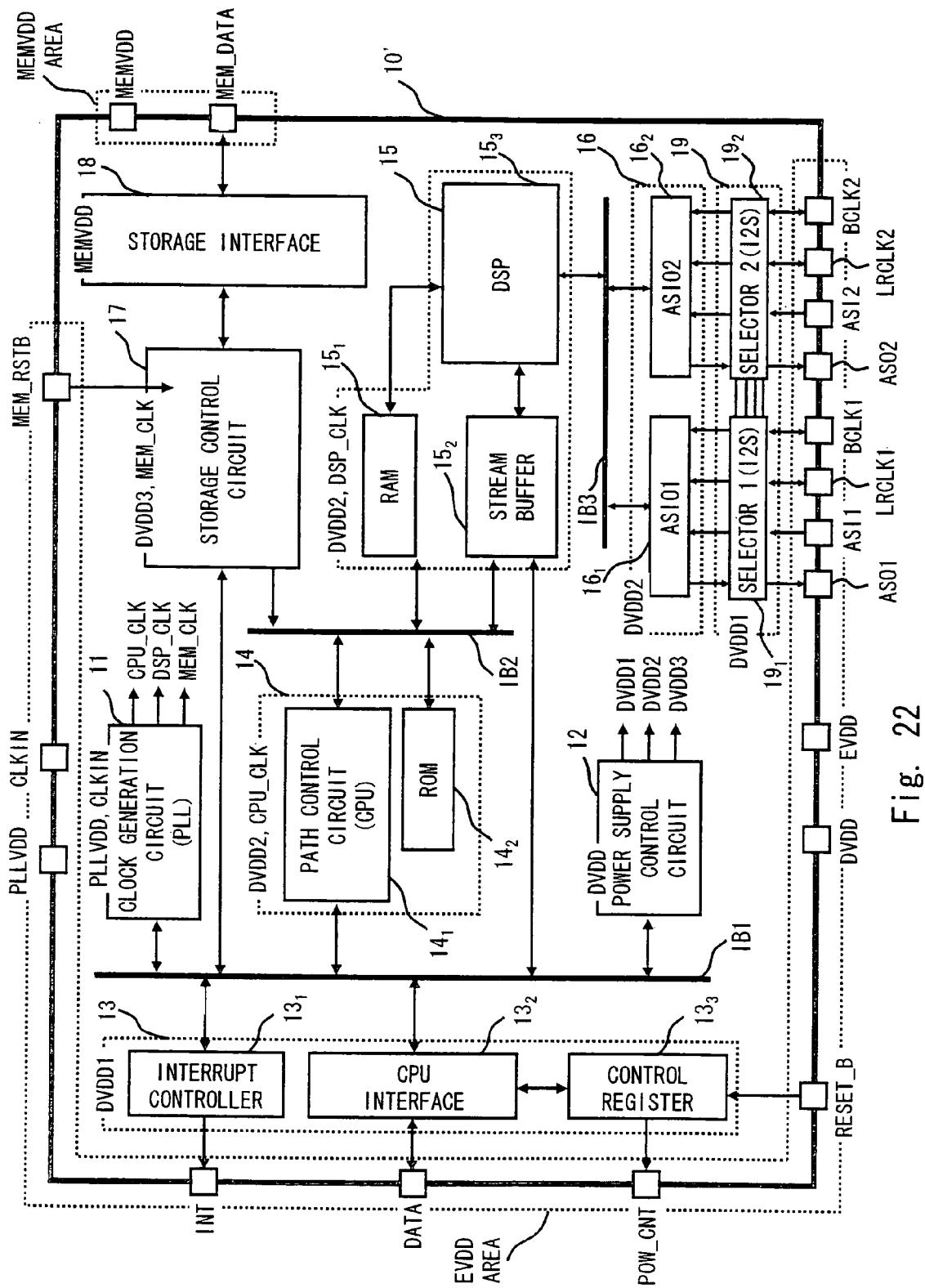
FIG. 22 is a detailed block diagram showing the signal processing control apparatus of the second embodiment.

FIG. 22 is a detailed block diagram showing the signal processing control apparatus 10'. The signal processing control apparatus 10' of the second embodiment is explained hereinafter in detail with reference to FIG. 22. In this embodiment, components identical to those in first embodiment are denoted by reference numerals identical to those therein with detailed description omitted.

As shown in FIG. 22, the audio interface 16 of the signal processing control apparatus 10' includes two input/output buffers (audio interfaces $16_1$ and $16_2$). The audio interfaces $16_1$ and $16_2$ are capable of sending/receiving data that is in compliant with I²S standard. The audio interfaces $16_1$ and $16_2$ are connected with the DSP $15_3$ through an internal bus IB3. The DSP $15_3$ processes audio data input from either the audio interfaces $16_1$ and $16_2$ depending on a configuration, of the internal bus IB3, and outputs the audio data to another audio interface. In the second embodiment, the DSP $15_3$ can operate in the same way as the first embodiment.

The selector 19 includes the selectors $19_1$ and $19_2$. The selectors $19_1$ and $19_2$ is capable of sending/receiving data in compliant with I²S standard. The selector $19_1$ is connected to the audio interface $16_1$ and the selector $19_2$ is connected to the audio interface $16_2$. The selectors $19_1$ and $19_2$ are connected with four input/output terminals each. For example the selector $19_1$ is connected with an audio output signal ASO1, an audio input signal ASI1, a channel switching clock signal LRCLK1, and a bit clock signal BCLK1. The selector $19_1$ is connected with an audio output signal ASO2, an audio input signal ASI2, a channel switching clock signal LRCLK2, and a bit clock signal BCLK2.

The selectors $19_1$ and $19_2$ are connected each other. Thus the selectors can send/receive data to each other without the audio interface 16. The selector 19 operates on the power supply DVDD1. The signal processing control apparatus 10' includes a transparent mode that uses functions of the selector 19. In the transparent mode, audio data generated by the application processor 4 can be sent to the analog front-end 8 without the DSP $15_3$ of the signal processing control apparatus 10'. That is, in the transparent mode, data input to one selector can be output from another selector without any process. When using the transparent mode, as the selector 19 operates on the power supply DVDD1, the power supply DVDD1 needs to be output.

Figure 23:
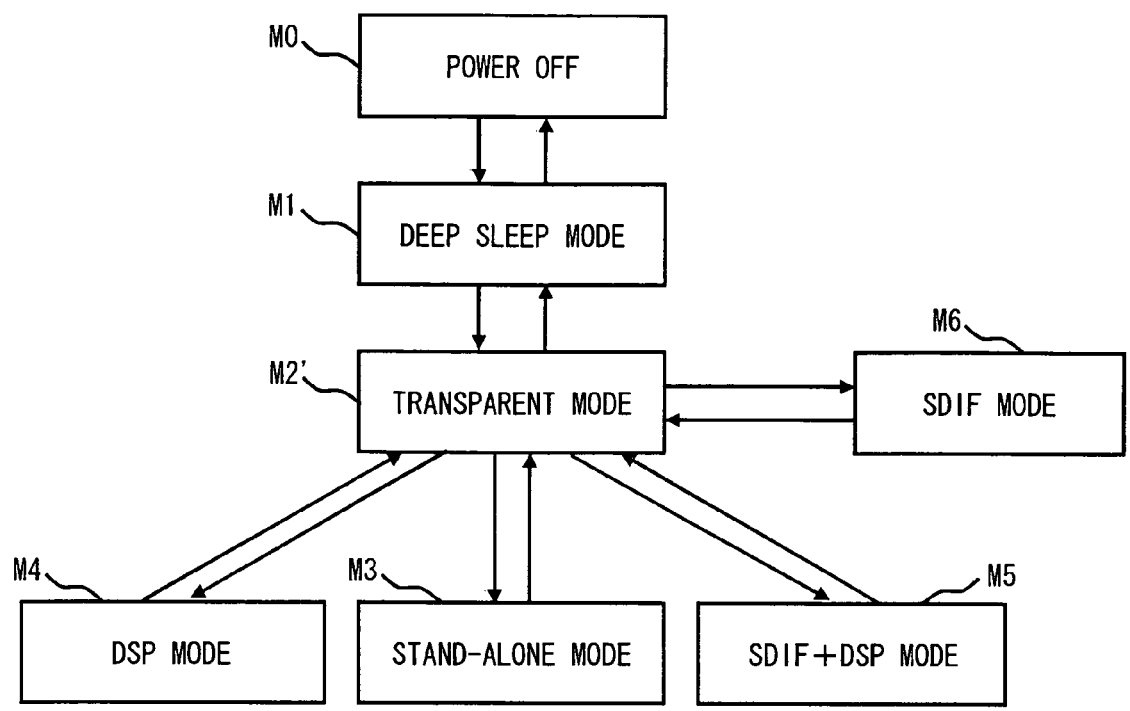
FIG. 23 is a state transition diagram showing operational modes of the signal processing control apparatus of the second embodiment.
Figure 24:
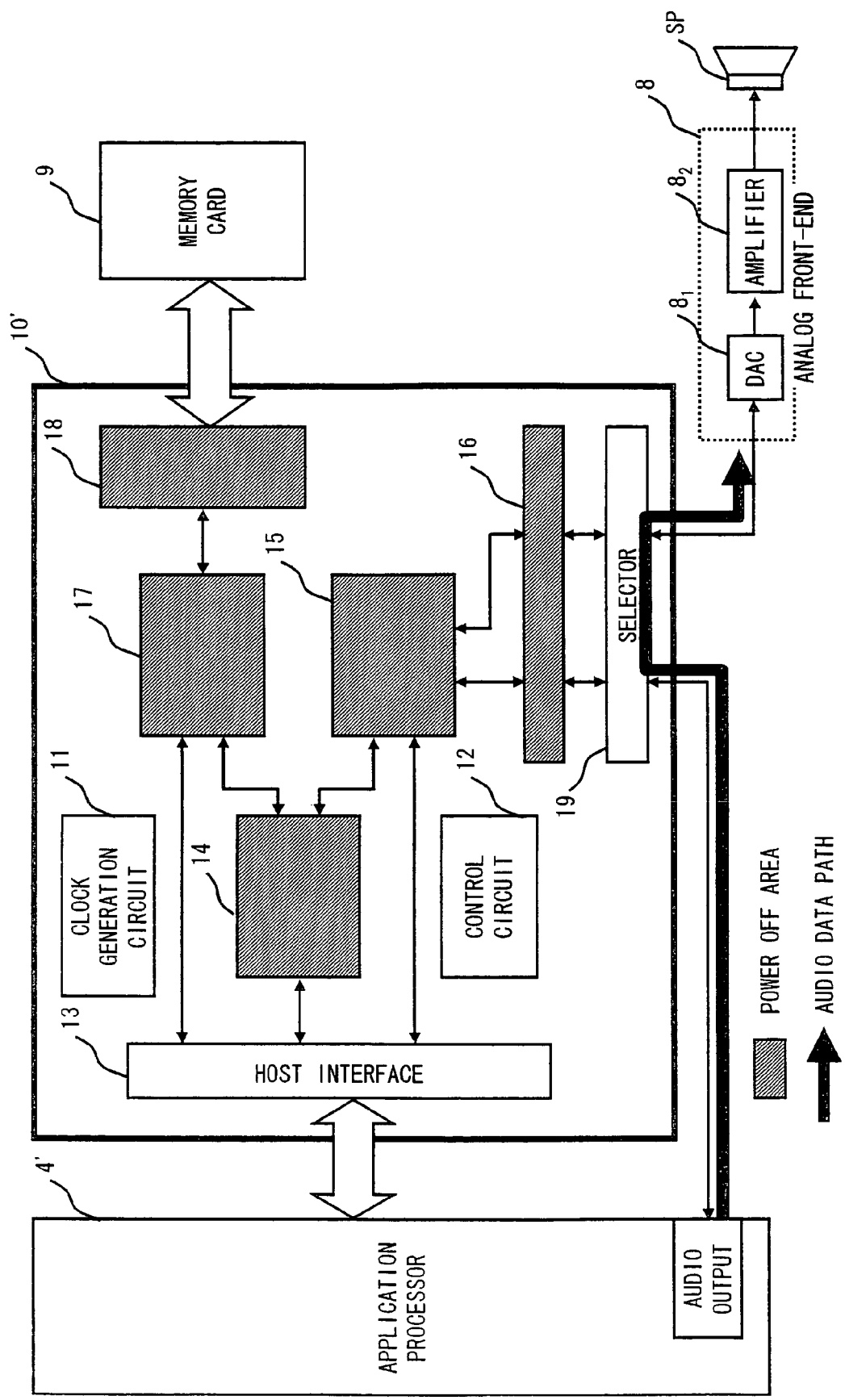
FIG. 24 is a view showing power supply state of the signal processing control apparatus of the first embodiment in transparent mode and audio data path.

FIG. 23 show a operational mode of the signal processing control apparatus 10' of the second embodiment and a transition of the modes. As shown in FIG. 23, a transparent mode M2' is specified instead of the sleep mode M2 of the first embodiment. Power supply state to be supplied is the same for the sleep mode M2 and the transparent mode M2'. FIG. 24 is a view showing power supply state of the signal processing control apparatus 10' and peripheral apparatuses thereof in case the application processor 4 sends audio data to the analog front-end in the transparent mode M2'.

As shown in FIG. 24, in the transparent mode M2', the clock generation circuit 11, the power supply control circuit 12, the host interface 13, and the selector 19 are operating. The audio data output from the application processor 4 is sent to the analog front-end 8 through the selector 19.

Specifically, by using the transparent mode M2, a pseudo audio data path can be created that is the same path as in a case without the signal processing control apparatus 10' of the second embodiment. Specifically, the signal processing control apparatus 10' is able to be easily added to an existing system by providing the selector 19. This enables to design a system with the signal processing control apparatus 10' added thereto without changing the existing system.

Figure 25:
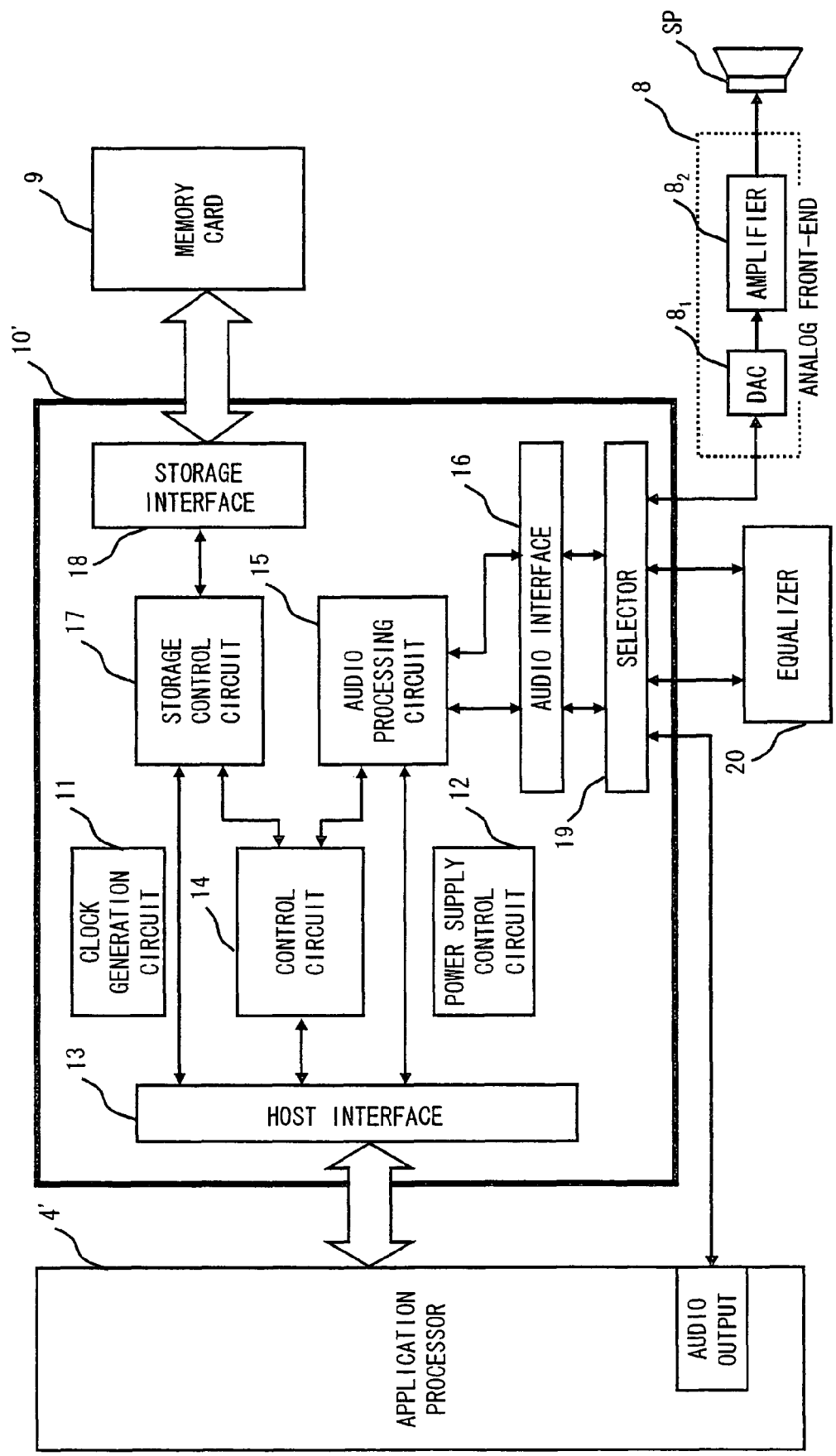
FIG. 25 is a block diagram showing the signal processing control apparatus of the second embodiment connected with an equalizer.

As another example, a system connected with an equalizer 20 through the connector 19 is shown in FIG. 25. The equalizer 20 adds special acoustic effect to audio data. The equalizer 20 is for example a 3D processor and the like that generates pseudo 3D sound. In this case, to connect the signal processing control apparatus 10' with the equalizer 20, one selector of the selector 19 is connected with an input terminal of the equalizer 20, and another selector is connected to an output terminal of the equalizer 20.

Figure 26:
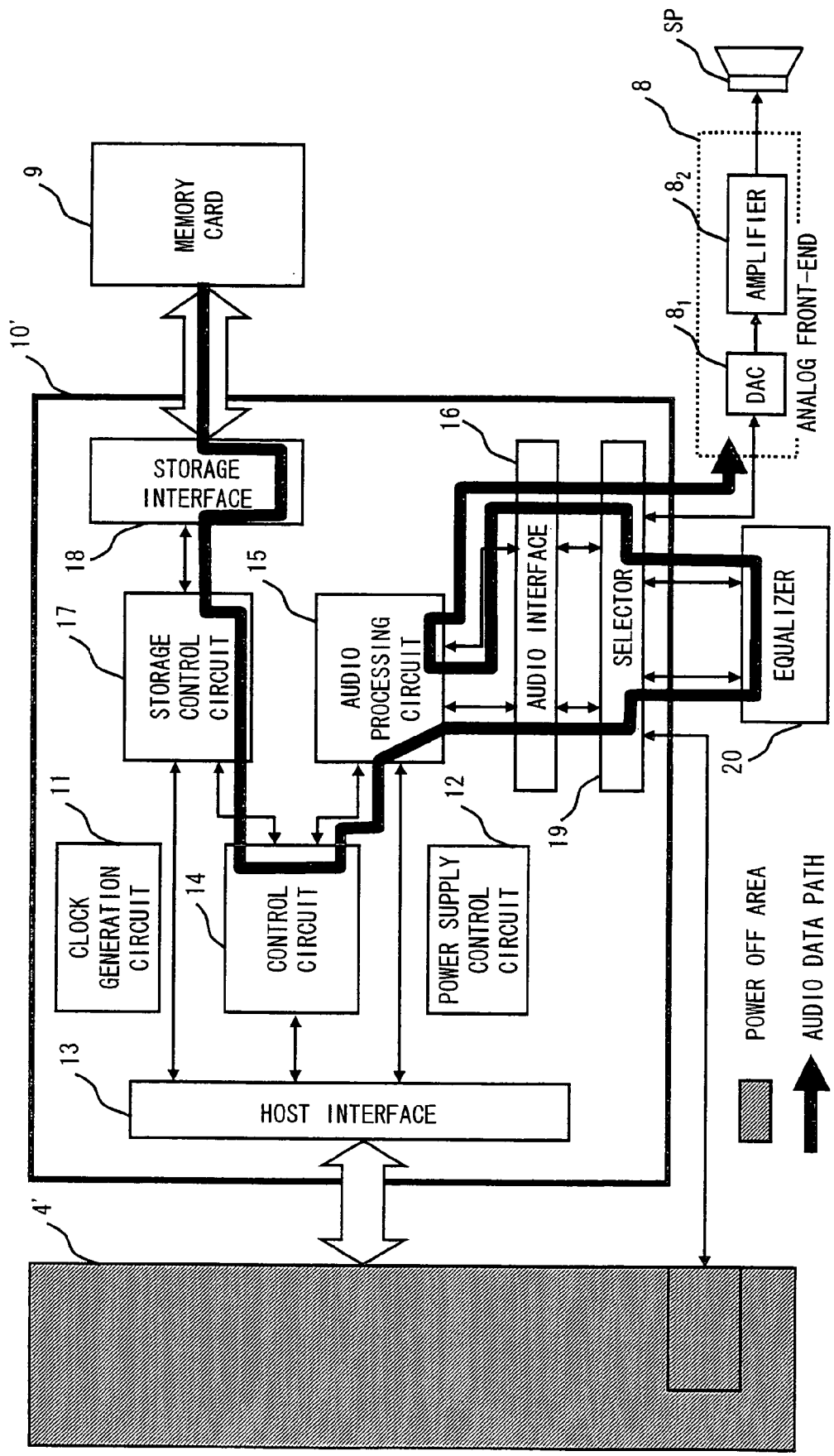
FIG. 26 is a view showing power supply statues of the signal processing control circuit of the second embodiment having an equalizer connected thereto in stand-alone mode and audio data path.

FIG. 26 is a block diagram showing power supply state of using equalizer 20 and audio data path in the stand-alone mode M3. As shown in FIG. 26, only the power supply of the application processor 4 is stopped in this case. The audio data is sent from the memory card 9 to the analog front-end through the storage interface 18, the storage control circuit 17, the control circuit 14, the audio processing circuit 15, the audio interface 16, the selector 19, the equalizer 20, the selector 19, the audio processing circuit 15, the audio interface 16, and the selector 19 in this order. In case the audio data uses the same path for input and output, the path is switched between input and output in time-sharing so as to avoid data collision.

In the stand-alone mode M3, the storage control circuit 17 reads audio data to be played from the memory card 9, decodes codes for copyright protection, and outputs the decoded audio data. The control circuit 14 sends the audio data output from the storage control circuit 17 to the audio processing circuit 15. The audio processing circuit 15 stores the audio data sent from the control circuit 15 to the stream buffer $15_2$. Then the audio data stored to the stream buffer $15_2$ is sequentially decoded by the DSP $15_3$, and output through the audio interface 16 and the selector 19. The output audio data is added with special acoustic effect by the equalizer 20. The audio data processed by the equalizer 20 is sent to the audio processing circuit 15 through the selector 19 and the audio interface 16. There is no process performed by the DSP $15_3$ of the audio processing circuit 15 at this time. The received audio data is temporality stored to the stream buffer $15_2$ of the audio processing circuit 15, and then output through the audio interface 16 and the selector 19. A function of the equalizer 20 determines whether to decode before sending the audio data to the equalizer 20 or after processing by the equalizer 20. The order can be specified as appropriate. The path for sending/receiving the audio data between the audio processing circuit 15 and the equalizer 20 is a path going through the selector $19_1$ and the selector $19_2$ is used for data transmission between the audio processing circuit and the analog front-end. This may be changed depending on connection of peripheral circuits.

As described in the foregoing, the signal processing control apparatus 10' is able to connect to the equalizer 20 for adding special acoustic effect to audio data by including the selector 19. In other words, the signal processing control apparatus 10' easily provides function that is difficult to achieve only with the signal processing control apparatus 10'.

Third Embodiment

Figure 27:
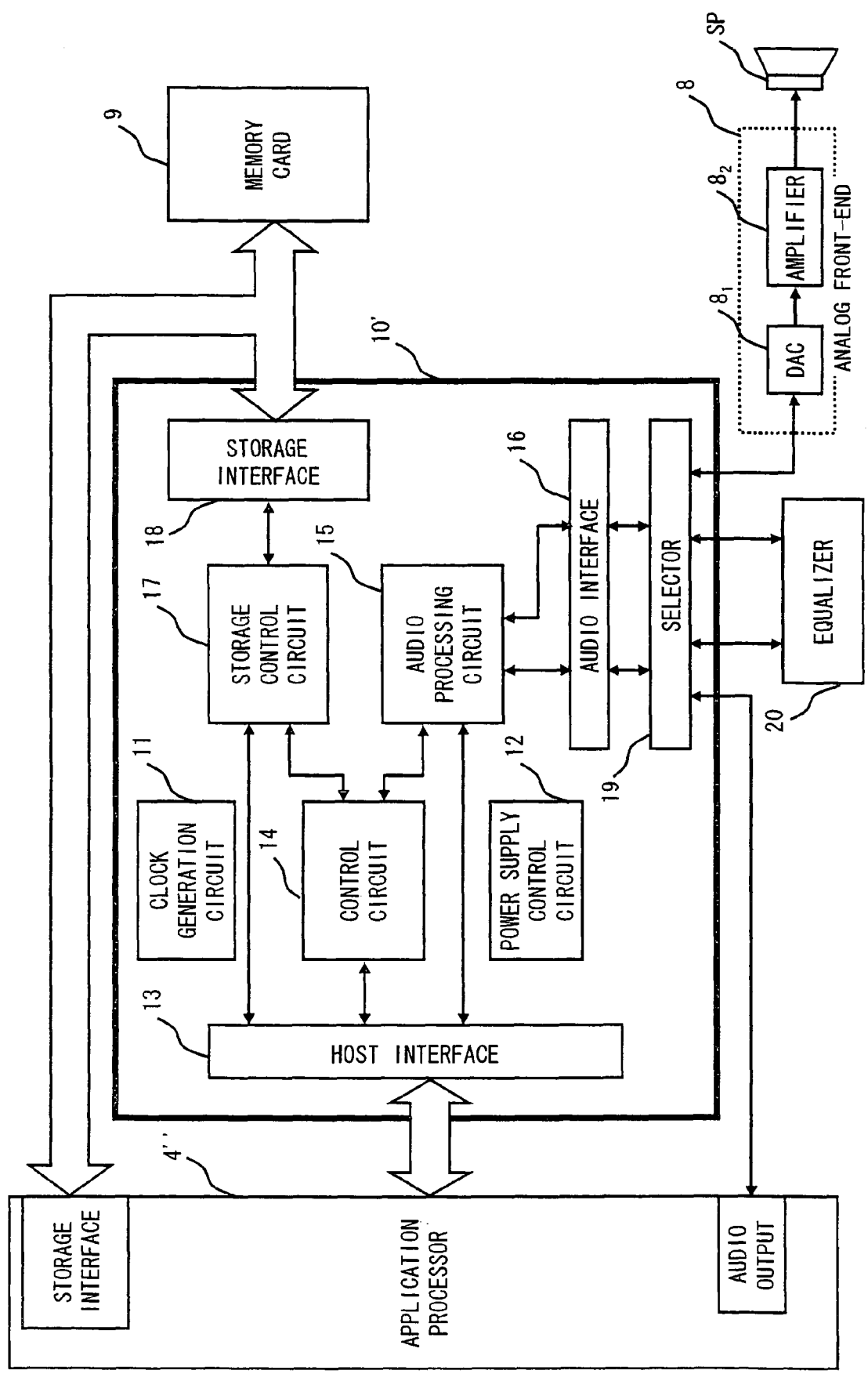
FIG. 27 is a block diagram showing a signal processing control apparatus having an application processor and peripheral apparatuses thereof according to a third embodiment.

An application processor 4" of a third embodiment includes a storage interface in addition to the application processor 4' of the second embodiment. The application processor 4" is able to access the memory card 9 without the signal processing control apparatus 10' because of the storage interface included therein. FIG. 27 is a block diagram showing the signal processing control apparatus 10' in case of using the application processor 4' and peripheral apparatus thereof.

As shown in FIG. 27, an access path from the application processor 4" to the memory card 9 is added. Further, to avoid an error occurs when the application processor 4" accesses the memory card 9, it is preferable that an output from the storage interface 18 of the signal processing control apparatus 10' is able to generate high impedance output.

Figure 28:
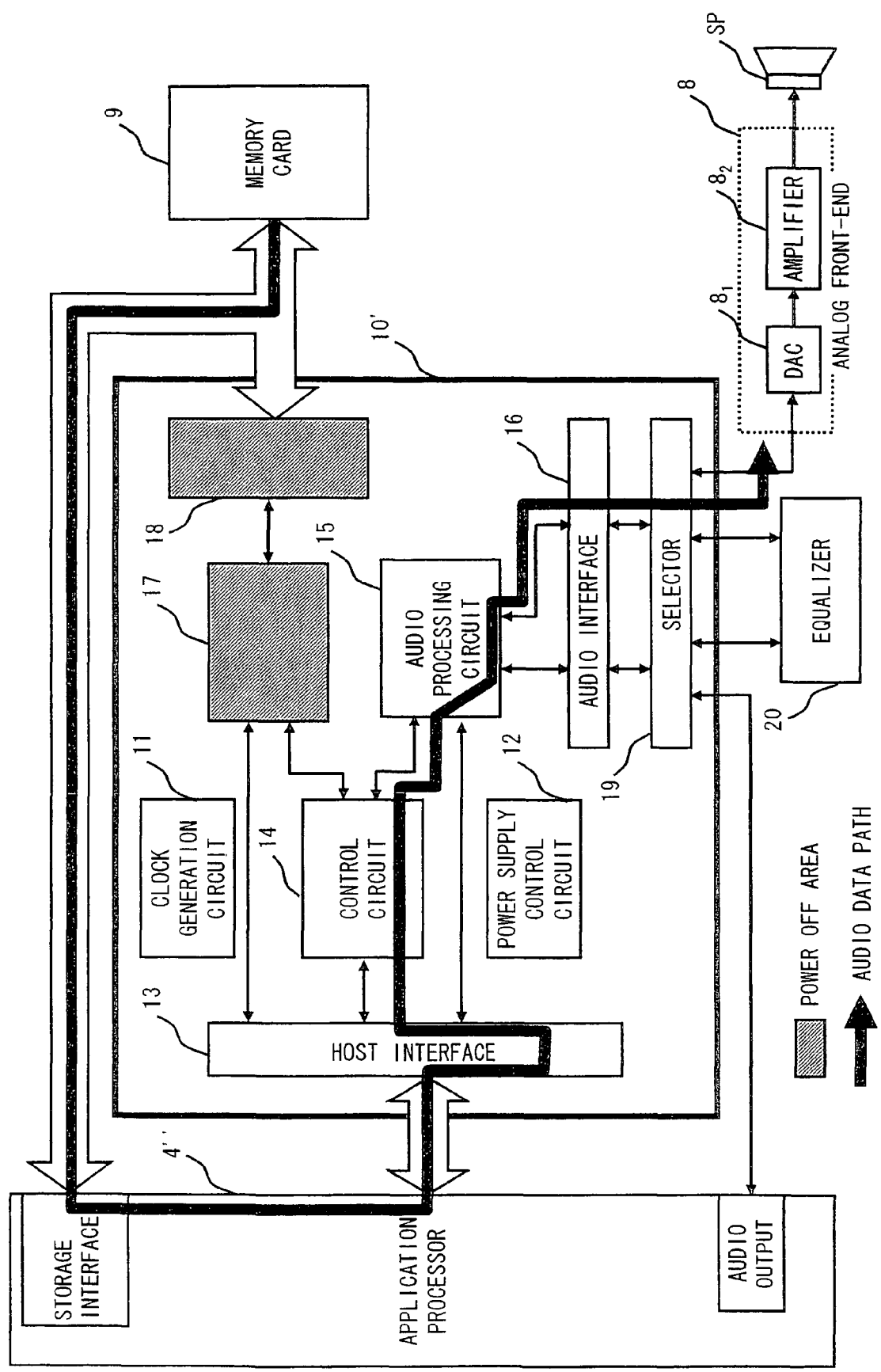
FIG. 28 is a view showing a power supply status of the signal processing control apparatus accessing the memory card 9 by application processor of the third embodiment and audio data path.

FIG. 28 is a block diagram showing path of audio data where the application processor 4" directly accesses the memory card 9 and power supply state of the signal processing control apparatus 10'. As shown in FIG. 28, the storage control circuit 17 and the storage interface 18 of the signal processing control apparatus 10' are stopped. Audio data is sent to the analog front-end 8 through the application processor 4" after being processed in the audio processing circuit 15 of the audio processing control apparatus 10'. Thus in this case, the audio processing control apparatus 10' is in DSP mode.

In this case, code for copyright protection on the audio data read out from the memory card 9 is decoded by the application processor 4. The application processor 4 outputs the decoded audio data. The audio data output from the application processor 4 is sent to the audio processing circuit 15 through the host interface 13. The audio processing circuit 15 stores the received audio data to the stream buffer $15_2$. Then the audio data stored to the stream buffer $15_2$ is sequentially decoded by the DSP $15_3$, and output through the audio interface 16.

Figure 29:
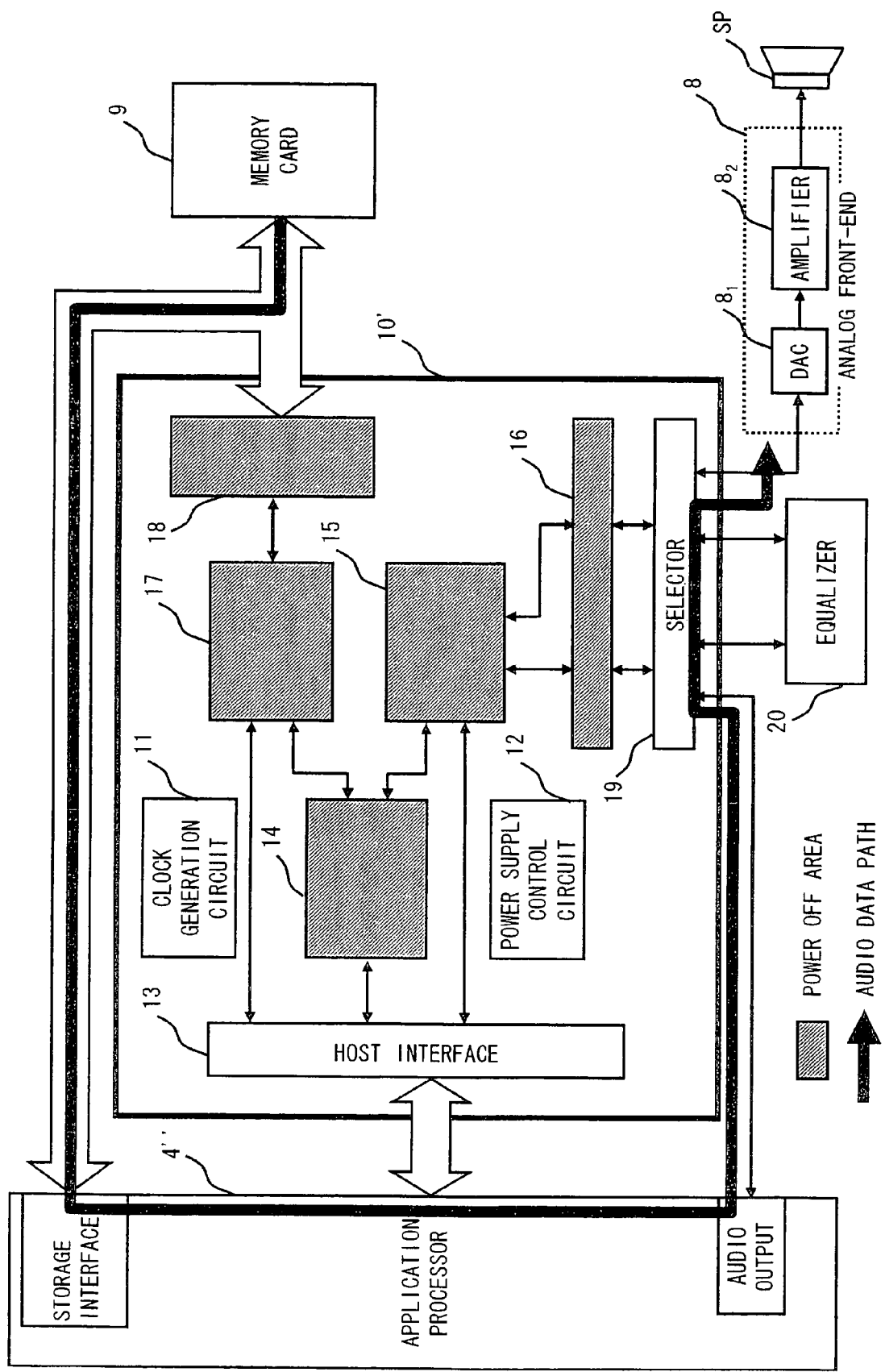
FIG. 29 is a view showing power supply state of the signal processing control apparatus accessing the memory card 9 by application processor of the third embodiment in DSP mode and audio data path.

The audio data can be played by the signal processing control apparatus 10' in the transparent mode. FIG. 29 is a view showing a path of audio data where the signal processing control apparatus 10' is in the transparent mode. As shown in FIG. 29, the audio data is readout from the memory card 9 and sent to the analog front-end 8 through the application processor 4 and the selector 19.

In this case, the code for copyright protection on the audio data read out from the memory card 9 is decoded in the application processor 4. The application processor 4 outputs the decoded audio data and sends the audio data through the selector 19.

As described in the foregoing, the storage interface 18 inside the signal processing control apparatus 10' is capable of high impedance output. This enables to use the signal processing control apparatus 10' without any problem even in case the application processor 4" includes the storage interface. That is, even in case the application processor 4" includes the storage interface, the signal processing control apparatus 10' can be used without almost no change from existing system.

The present invention is not restricted to the above-mentioned embodiment but various changes may be made. For example the power supply DVDD2 supplies power to the control circuit 14, the audio processing circuit 15, and the audio interface 16. However power supplies that can be controlled independently may be prepared for the blocks. This enables to control the blocks more finely, thereby further reducing power consumption.

It is apparent that the present invention is not limited to the above embodiment and it may be modified and changed without departing from the scope and spirit of the invention.

What is claimed is:

1. A semiconductor apparatus, comprising:
a first to a fourth external terminals;
a decoding circuit; and
a power supply circuit configured to selectively activate and deactivate portions of the decoding circuit based upon first and second encoded data input to the first external terminal,
wherein the semiconductor apparatus in a first mode, inputs the first encoded data from the first external terminal; decodes the first encoded data by the decoding circuit to generate a first decoded data; and outputs the first decoded data from the fourth external terminal; and
the semiconductor apparatus in a second mode, inputs the second encoded data from the first external terminal; outputs the second encoded data input from the first external terminal from the second external terminal; inputs the second encoded data output from the second external terminal from the third external terminal; decodes the second encoded data input from the third external terminal by the decoding circuit to generate a second decoded data; and outputs the second decoded data from the fourth external terminal.

2. The semiconductor apparatus according to claim 1, wherein the second and the third external terminals are the same external terminals.

3. The semiconductor apparatus according to claim 2, further comprising a decoding circuit for decoding code for copyright protection made to the first encoded data.

4. The semiconductor apparatus according to claim 1, further comprising a decoding circuit for decoding code for copyright protection made to the first encoded data.

5. The semiconductor apparatus according to claim 1 wherein the first encoded data and second encoded data are of different media formats.

6. The semiconductor apparatus according to claim 5 wherein the second encoded data includes both video and audio content.

7. The semiconductor apparatus according to claim 1, wherein the decoding circuit compresses the first and second encoded data.

8. A signal processing system, comprising:
a first semiconductor apparatus having a first to a fourth external terminals and a decoding circuit;
a second semiconductor apparatus having a fifth to a sixth external terminals; and
a power supply circuit configured to selectively enable and disable portions of the first semiconductor apparatus and the second semiconductor apparatus based upon encoded data input by the first semiconductor apparatus and the second semiconductor apparatus,
wherein the first semiconductor apparatus in a first mode, inputs a first of the encoded data from the first external terminal; decodes the first encoded data by the decoding circuit to generate a first decoded data; and outputs the first decoded data from the fourth external terminal; and
the first semiconductor apparatus in a second mode, inputs a second of the encoded data from the first external terminal; outputs the second encoded data input from the first external terminal from the second external terminal;
the second semiconductor apparatus, inputs the second encoded data output from the second external terminal from the fifth external terminal; and outputs the second encoded data input from the fifth external terminal from the sixth external terminal; and
the first semiconductor apparatus, inputs the second encoded data output from the sixth external terminal from the third external terminal; decodes the second encoded data input from the third external terminal by the decoding circuit to generate a second decoded data; and outputs the second decoded data from the fourth external terminal.

9. The semiconductor apparatus according to claim 8, wherein, under the second mode, the power supply circuit enables the first to fourth external terminals by providing power.

10. The semiconductor apparatus according to claim 8, wherein the power supply circuit disables the second and third external terminals under the first mode.

* * * * *